United States Patent [19]

Newhall

[11] Patent Number: 5,448,206

[45] Date of Patent: Sep. 5, 1995

[54] SYSTEMS WITH INCREASED INFORMATION RATES USING EMBEDDED SAMPLE MODULATION AND PREDISTORTION EQUALIZATION

[76] Inventor: Edmunde E. Newhall, Suite 2208 1200 6th St. SW., Calgary AB, Canada, T2R 1H3

[21] Appl. No.: 137,419

[22] Filed: Oct. 18, 1993

[30] Foreign Application Priority Data

Jul. 9, 1993 [WO] WIPO ............... PCT/CA93/00282

[51] Int. Cl.$^6$ ..................... H03C 3/00; H03D 3/00; H04L 27/20; H04L 27/22
[52] U.S. Cl. ............................... 332/103; 329/300; 329/304; 329/311; 329/318; 332/100; 332/107; 332/115; 332/123; 375/229; 375/240; 375/242; 375/257
[58] Field of Search ............... 332/107, 115, 116, 123, 332/159, 100, 103; 375/24, 41, 58, 11–15, 60, 96, 39, 44, 45, 52, 62, 67, 78, 83, 80, 88; 329/311, 318, 349, 300, 304; 455/63, 67.3, 108, 214

[56] References Cited

U.S. PATENT DOCUMENTS 4,615,038 9/1986 Lim et al. ............................ 375/14
5,105,445 4/1992 Karam et al. ....................... 375/60

Primary Examiner—Siegfried H. Grimm

[57] ABSTRACT

A system is described which achieves an increased rate of transmission by transmitting multiple symbols in one symbol time. The information in the overlapping symbols can be recovered if the symbol used for transmission is chosen so that a subset of the samples representing the symbol has an inverse. The construction of suitable symbols is illustrated. Effective operation of the system depends on equalizaton which will recover the the baseband signal shape. Methods of equalization are depicted which are suitable for use with this sytem including equalization realized by predistorting the signal at the transmitter so that it arrives at the receiver undistorted. The invention is applied to to baseband and passband systems and the application of predistortion equalization to the fading passband channel is described.

21 Claims, 19 Drawing Sheets

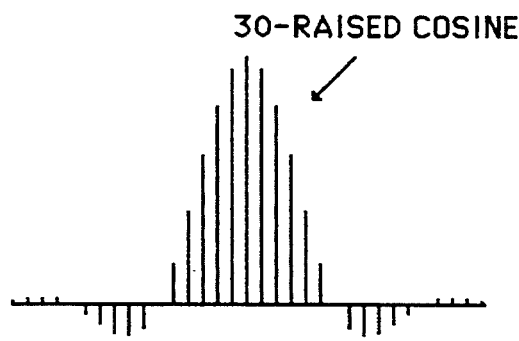
FIG. 2A — 30-RAISED COSINE
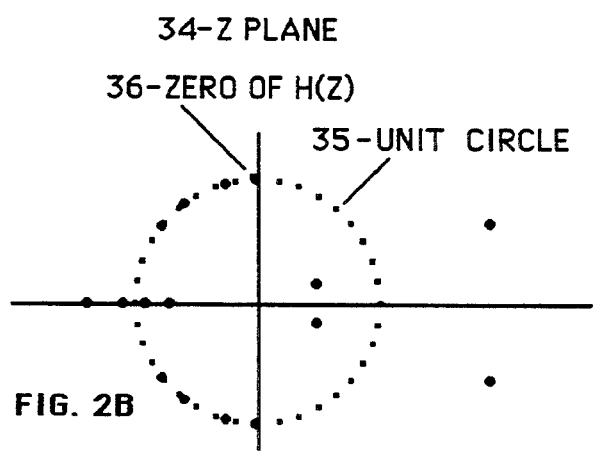
FIG. 2B — 34-Z PLANE, 36-ZERO OF H(Z), 35-UNIT CIRCLE
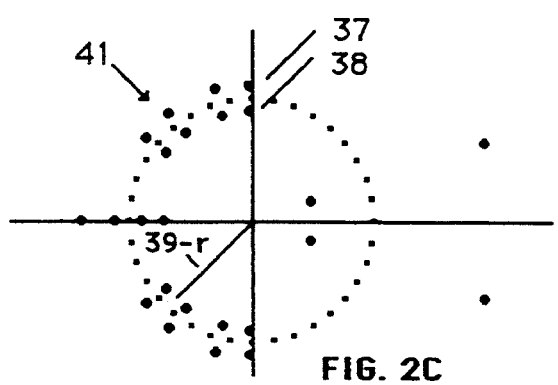
FIG. 2C — 37, 38, 41, 39-r
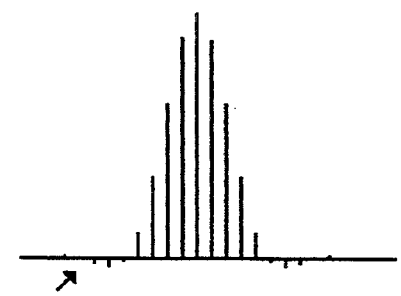
FIG. 2D — 40-COMPOSING FUNCTION
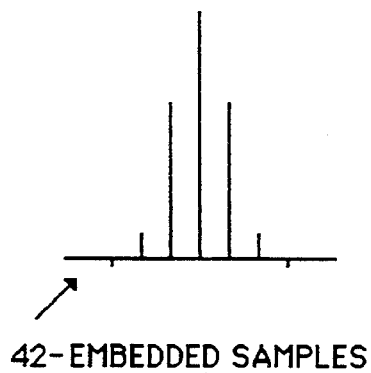
FIG. 2E — 42-EMBEDDED SAMPLES
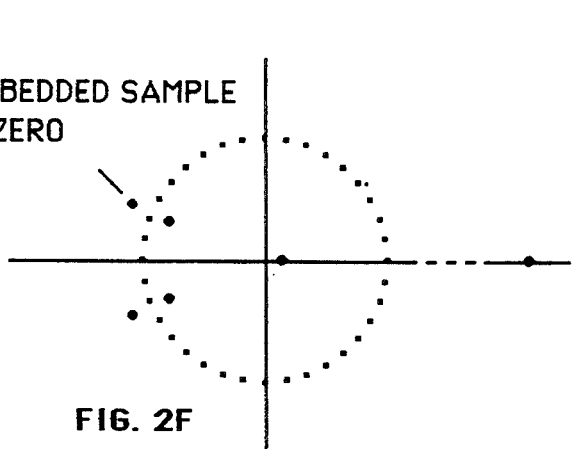
FIG. 2F — 44-EMBEDDED SAMPLE ZERO 80-Hah!

79-Binary: 0 0 0 1 0 0 1 0 1 0 0 0 0 1 1 0 0 0 0 1 0 1 1 0 1 0 0 0 0 1 0 0

81-Octal:     0    4    5    0    3    0    2    6    4    1    0

82-With Prepulse:     7 0 0 0 7 0 0 0 4 5 0 3 0 2 6 4 1 0

83-Composing Func Sign:     + + + − − − − − + + + + + − − − − −

FIG. 4

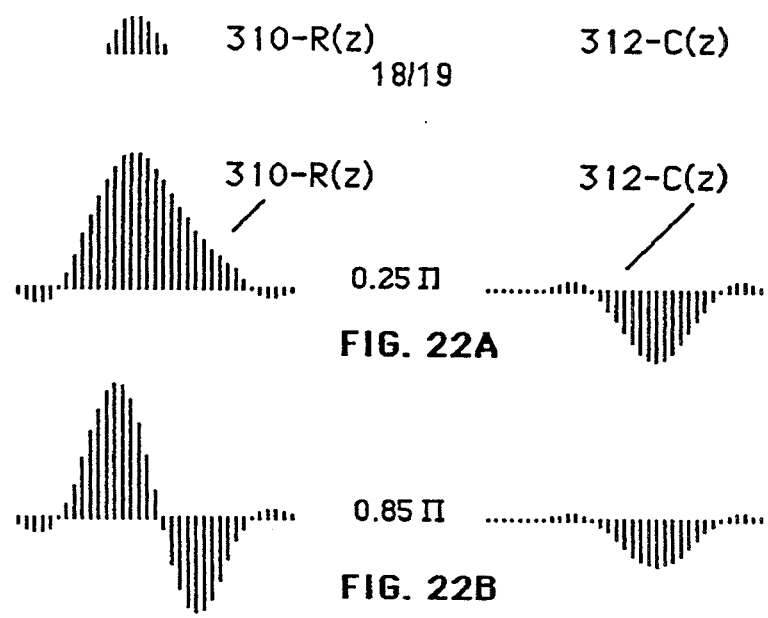
FIG. 22A
FIG. 22B
FIG. 22C
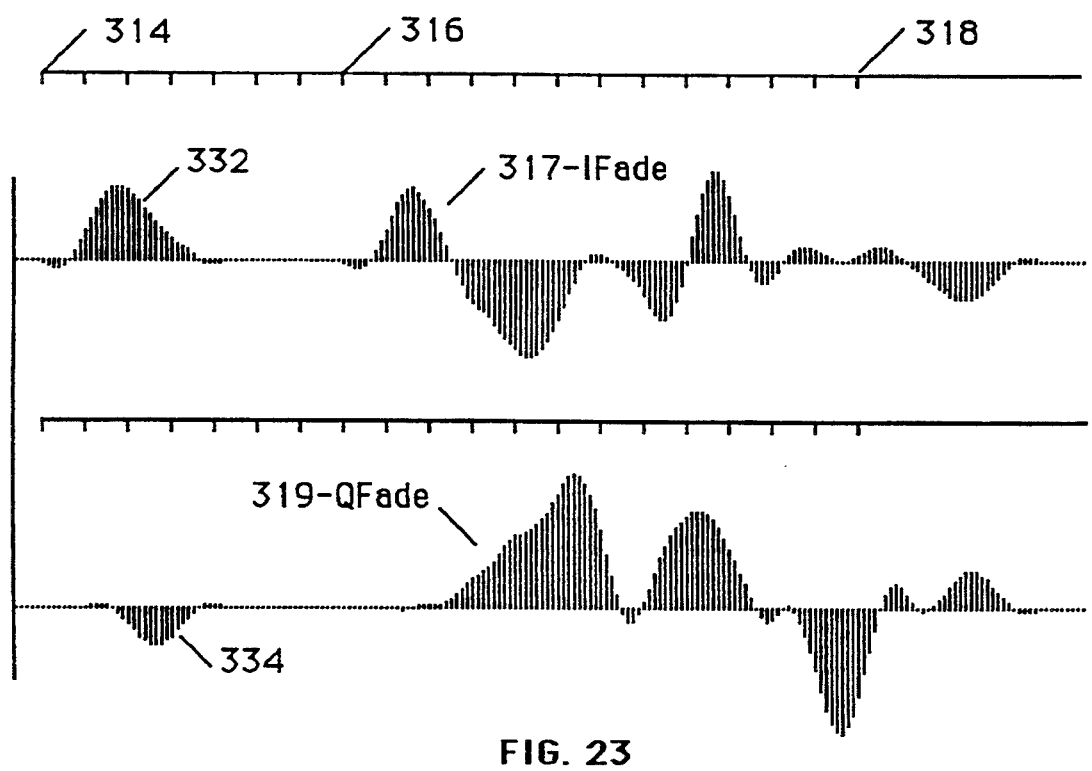
FIG. 23

SYSTEMS WITH INCREASED INFORMATION RATES USING EMBEDDED SAMPLE MODULATION AND PREDISTORTION EQUALIZATION

This invention relates to increasing the number of bits which can be transmitted in one cycle of bandwidth. Bandwidth efficient modulation methods have been studied in detail; for example see Proakis, Digital Communications, McGraw-Hill Book Company, chapter 4, Comparison of Digital Signalling Methods. These studies compare the number of bits of information which can be transmitted in one carrier cycle. The measure used in these comparisons is bits/hertz. Quadrature amplitude modulation, referred to as QAM, is often ranked as the most efficient modulation method. The invention described here transmits significantly more bits/hertz than QAM.

Modems are very often compared as to their information transmitting ability measured in bits/second. In the transmission of data over voice grade telephone lines the highest speed modems, measured in bits/second, achieve their high speed by using modulation methods known to have a high measure of bits/hertz. The invention described here can be used to increase the rate at which data can be transmitted over voice grade lines.

The frequency spectrum available in the large cities for cellular systems is limited. This results in congestion at rush hours in the existing analog systems. These analog systems are being supplemented by digital systems in order to increase the number of calls the system can support during busy hours. Using the modulation method described here the number of subscribers which can be accommodated could be further increased in the digital systems presently being deployed.

Accordingly, the invention describes a novel modulation and demodulation method which is capable of transmitting and receiving significantly more bits/hertz than any of the conventional modulation methods.

Bandwidth efficient, reliable communication systems, in addition to using efficient modulation methods, use equalization techniques. To maximize the number of bits/hertz the modulation apparatus described here should be coupled with an equalization technique which carefully preserves the signal shape. Techniques which are suitable are described. In some cases these are novel in their own right and can be applied when conventional modulation apparatus is used. Accordingly, the invention describes equalization techniques which can be used in conjunction with the invention, some of these equalization techniques having novelty in their own right.

Voice grade telephone lines are one type of baseband channel. The application of the invention to baseband channels is described. Radio channels are often referred to as passband channels, as opposed to baseband channels; see for example Lee/Messerschmitt Digital Communication, Kluwer Academic Publishers. Passband channels use a carrier and some means of moving the baseband signal to the carrier frequency, followed by recovery of the baseband signal at the receiver. The problems involved in applying the modulation method to passband channels and providing equalization are somewhat different from those encountered in applying the invention to baseband channels. Accordingly, the invention shows how the modulation method can be combined with equalization techniques to achieve an increased information rate when using passband channels.

Communication systems use a sequence of symbols to transmit the data. Each symbol occupies a time slot, called a symbol time, and the symbol in each symbol time is modified in amplitude or phase in accordance with the incoming information. In many systems a Nyquist pulse is used as a basic symbol; see for example Proakis. The motivation for the use of this pulse comes from the lack of interference with adjacent pulses because of the way in which the zero crossings are distributed. Equalization involves removing the interference between symbols introduced by the channel. The amount of information which is carried by the system is determined by the maximum symbol rate which can be sent without the symbols overlapping, as well as the number of different symbols which can be used in a symbol time slot. Partial response signalling is described in Lee/Messerschmitt; Katoh, Partial Response Quadrature Amplitude Modulation System, U.S. Pat. No. 4,055,727; Bhopale et al, Quadrature-Amplitude-Modulation Data Transmission Systems and Transmitters, The Patent Office London, 1 592 556; Sato, Self-Adaptive Equalizer for Multilevel Data Transmission According to Correlation Coding, U.S. Pat. No. 3,921,072; Bergmans, Data transmission system comprising a decision feedback equalizer and using partial response techniques, European Patent Office 0 294 897. Partial response signalling has received attention because it is a step in the direction of transmitting more information by putting the symbols closer together and allowing some controlled ISI (intersymbol interference) between adjacent symbols which is removed at the receiver.

In the modulation method described here multiple overlapping symbols are transmitted in a symbol time with interference extending over a number of symbols. This increases the number of bits transmitted in a symbol time without significantly increasing the bandwidth, thereby increasing the number of bits/hertz. In order to recover the information from the overlapping symbols the shape used in place of a Nyquist pulse is a band limited function, having a set of samples called embedded samples, whose Z transform has an inverse. An embedded sample inverse filter is the filter which when convolved with the embedded samples gives an impulse. The demodulator locates the embedded samples in the continuous wave which arrives at the receiver then passes them through the inverse filter to recover the transmitted information from the overlapping symbols. This method of modulation is referred to as embedded sample modulation.

Inverse filtering to recover transmitted information has been described by Neeser, Empfänger für ein DSSS-Signal, European Patent Office 0486 833 A1. A DSSS (Direct Sequence Spread Spectrum) receiver is described which uses an inverse filter at the receiver to recover the transmitted information. It is stated that the exact inverse filter requires an infinite number of samples which implies that the inverse filter being as used is an IIR (infinite impulse response) filter. The practical implementation has only a finite number of samples which means that whenever a single unit pulse is expected as an output, small pulses will occurr in time before and after the single unit pulse. This means that some residual intersymbol interference will exist in the output. This residual distortion is unacceptable in the system described herein as this will limit the number of levels which can be transmitted. The inverse filter used here is a FIR (finite impulse response) filter; see for example Rabiner and Gold, Theory and Application of Digital Signal Processing, Prentice—Hall for a discussion of IIR and FIR filters. The small pulses surrounding the single unit pulse can be made arbitrarily small with a finite number of terms in the inverse filter. This is accomplished, as will be described, by moving the zeros of the Z transform of the embedded samples off the unit circle thereby making the power series describing the inverse filter absolutely convergent.

Equalization techniques are used to increase the rate at which information can be transmitted by removing the interference between adjacent symbols. These techniques usually involve filtering at the receiver. Filtering at the receiver to remove linear and nonlinear distortion is described in Lim, deceased et al, Equalization of Modulated Data Signals Utilizing Tentative and Final Decisions and Replication of Non-Linear Channel Distortion, U.S. Pat. No. 4,615,038. A conventional linear equalizer is used at the receiver in combination with a replica of the nonlinear distortion to equalize the signal for the linear distortion of the channel as well as any nonlinear distortion. The system described in Lim is directed towards equalizing channels of a voice grade kind where fading and time variation of the channel are not significant problems. The equalization method described herein addresses these problems.

In radio passband systems fading can occur when signal components are shifted in time relative to one another so as to substantially cancel at the receiver. In the equalization method described here filtering is introduced at the transmitter, this filtering shifts the signal components relative to one another so that the shifting introduced by the channel will cause an undistorted signal to arrive at the receiver. This equalization method has been termed predistortion equalization. Once predistortion equalization is established, and if the receiver moves slowly, so that the predistortion equalization can be continously updated the receiver will never see any fades. In this case diversity reception can be replaced by predistortion equalization.

The equalization method described herein involves testing the channel with a known waveform, determining the filters to be used at the transmitter and transmitting this filter information to the transmitter, In order to provide continuous updating to compensate for motion the filtering required in the next packet could be transmitted to the transmitter at the end of the last receiver to transmitter packet. Provided the receiver does not move a significant fraction of a wavelength between packets this updating will avoid any fades. Whenever the receiver is a handheld and the motion is by walking this method of updating will significantly reduce the probability of fading.

The equalization method described herein establishes FIR (finite impulse response) filters for use at the transmitter. These FIR sample sequences have been given the name composing functions. These composing functions are scaled and added to generate the baseband waveforms as will be described. The undistorted waveforms at the receiver will be seen to be the sum of scaled values of undistorted composing functions, In the event there is residual distortion at the receiver then the received waveforms will be the sum of scaled values of some distorted composing functions. At the receiver the equalization method determines the linear filtering required to map the distorted composing functions into undistorted composing functions. This same filtering is applied to the distorted received waves to generate undistorted received waves. In the event the receiver is moving rapidly so the channel time response changes significantly during the reception of a packet a method is used to extract the distorted composing functions from a segment of the received waves. These distorted composing functions are used to determine the equalization required for that wave segment. The process is repeated for successive wave segments thereby accomplishing equalization of the time varying channel.

The equalization method described herein to handle slowly time varying channels subject to fading may do all the equalization at the transmitter, a portion at the transmitter and a portion at the receiver or all the equalization at the receiver. These are referred to as full predistortion equalization, partial predistortion equalization, full receiver equalization respectively. In a particular instance where the receiver motion changes from stationary to moving slowly to moving rapidly the equalization used may be varied from full predistortion equalization to full receiver equalization. For handheld receivers which move slowly no equalization is required at the receiver therefore the real time digital signal processing is significantly reduced, the power is reduced, the cost is reduced and the receiver will never see any fades.

In summary the equalization method described herein equalizes by removing the distortion in the oversampled received waves by predistortion, equalization at the receiver or a combination. After undistorted waves are recovered sampling can be done at the symbol times and any residual intersymbol interference removed by conventional equalization techiques. By contrast conventional equalization techniques as described in Lim are used at the receiver to remove the intersymbol interference from samples taken at the symbol times regardless of the amount of intersymbol interference. Most of these conventional techniques work very well when used in the environment for which they were designed. Some will not converge at all when the intersymbol interference becomes too large.

Karam et el, Dispositif de prédistortion pour systéme de transmission numérique, European Patent Office 0 421 533 A1; Karam et el, Predistortion Arrangement for a Digital Transmission System, U.S. Pat. No. 5,105,445, describe a system using predistortion equalization. A linear filter is used to predistort the signal going into a power amplifier in a sense opposite to the nonlinear distortion introduced by the amplifier so the amplifier generates a signal with the nonlinear distortion removed. This invention does not address the problem of determining from the channel response the FIR filters to be used at the transmitter so that the signals arriving at the receiver are undistorted. The equalization method described herein describes a method of determining FIR filters at the transmitter which when used will generate undistorted signals at the receiver.

In one embodiment of the invention a waveform is stored in memory which is referred to as a composing function. Modulation and equalization are accomplished by transmitting overlapping scaled versions of the composing function, the scaling being done in accordance with the information to be transmitted. It is easy to show this modulating method can be used to generate most forms of baseband signals required, including for example, the baseband I and Q channels required for Digital Cellular Systems, as described in Electronic Industries Association, EIA/TIA Interim Standard, Cellular System, IS-54-A. Application of the invention to Digital Cellular involves sending a test pattern on the I and Q channels. From the response two composing functions are generated which when used at the transmitter to generate predistorted I and Q baseband signals, causes undistorted I and Q baseband signals to arrive at the receiver.

Predistortion equalization by itself can significantly increase the information rate transmitted. When used in combination with embedded sample modulation the information rate can be further increased. Accordingly, the invention described here includes a description of predistortion equalization as an invention, embedded sample modulation as an invention, as well as the combination.

The invention can be further described with reference to the following drawings.

DESCRIPTION OF THE DRAWINGS

FIG. 1A: Modulator.
FIG. 1B: Demodulator.
FIGS. 2A-F: Construction of a Composing Function with Embedded Samples for the Baseband Channel.
FIG. 2A: Nyquist Pulse.
FIG. 2B: Zeros of the Nyquist Pulse.
FIG. 2C: Zeros moved off the Unit Circle.
FIG. 2D: Composing Function.
FIG. 2E: Embedded Samples.
FIG. 2F: Zeros of the Embedded Samples.
FIG. 3A: First Iteration.
FIG. 3B: Third Iteration.
FIG. 3C: Fifth Iteration.
FIG. 4: Information to be Transmitted on a Simple Waveform.
FIG. 5A: Modulated Wave.
FIG. 5B: Embedded Samples.
FIG. 5C: Inverse Filter Output.
FIG. 6A: Sampling at the Embedded Sample times.
FIG. 6B: Sampling offset from the Embedded Sample times.
FIG. 6C: Linear Interpolation.
FIG. 6D: Samples after Interpolation.
FIG. 7A: Composing Function and Associated Inverse.
FIG. 7B: Transmitted Wave and Associated Embedded Samples.
FIG. 7C: Samples output from the Inverse Filter.
FIG. 9A: Channel Test Pulse.
FIG. 9B: Test Pulse Spectrum.
FIG. 9C: Spectrum of Channel Response to the Test Pulse.
FIG. 9D: Spectrum of the Channel Response.
FIG. 9E: Spectrum of the Inverse Channel.
FIG. 10A: Transmitted Signal.
FIG. 10B: Received Signal.
FIG. 10C: Received Signal after Basband Equalization by a Baseband Carrier Equalizer
FIG. 11A: Dipulse Composing Function and Reference Signal.
FIG. 11B: Composing Function.
FIG. 11 C: Transmitted Signal.
FIG. 11D: Received Signal.
FIG. 16A: Digital Cellular Composing Function.
FIG. 16B: Zeros of the Composing Function.
FIG. 16C: Zeros Moved off the Unit Circle.
FIG. 16D: Modified Composing Function.
FIG. 16E: Embedded Samples.
FIG. 16F: Inverse Associated with the Embedded Samples.
FIG. 17A: Transmitted I and Q Waves and the Associated Embedded Samples.
FIG. 17B: Embedded Samples Streams after Filtering by the Inverse Filter.
FIG. 18A: I and Q Tranmitted Waves.
FIG. 18B: I and Q Received Waves.
FIG. 18C: I and Q waves after Equalization.
FIG. 19A: Power Spectrum of F1.
FIG. 19B: Power Spectrum of F2.
FIG. 19C: Power Spectrum of IFade.
FIG. 19D: Power Spectrum of QFade.
FIG. 20A: Dual Composing Functions Used for Predistortion Equalization.
FIG. 20B: Channel Response to the Dual Composing Functions.
FIG. 21A: Reference I and Q Waves.
FIG. 21B: Transmitted I and Q Waves.
FIG. 21C: Received I and Q Waves.
FIGS. 22A-C: Channel Test Signal Distortion Caused by Transmitter Motion.
FIG. 22A: R(z) and C(z) Response with $\omega_c \Delta t = 0.25$ $\Pi$.

FIG. 22B: R(z) and C(z) Response with $\omega_c \Delta t = 0.85 \Pi$.

FIG. 22C: R(z) and C(z) Response with $\omega_c \Delta t = 1.45 \Pi$.

FIG. 23: I and Q Signals Used to Demonstrate Distorted Composing Function Extraction.

FIG. 24A: Power Spectrum of F1.

FIG. 24B: Power Spectrum of F2.

FIG. 24C: Power Spectrum of IFade.

FIG. 24D: Power Spectrum of QFade.

FIG. 25A: Recoverd Distorted R(z) and C(z).

FIG. 25B: Power Spectrum of the Inverted Denominator.

DESCRIPTION OF THE INVENTION

Figure 1A:
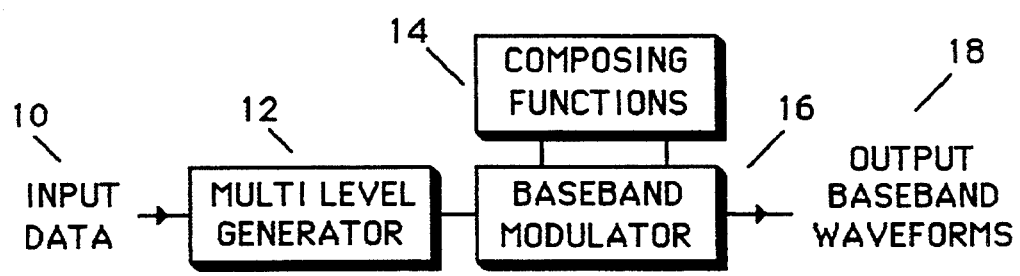
FIGS. 1A-B: System Block Diagram.
Figure 1B:
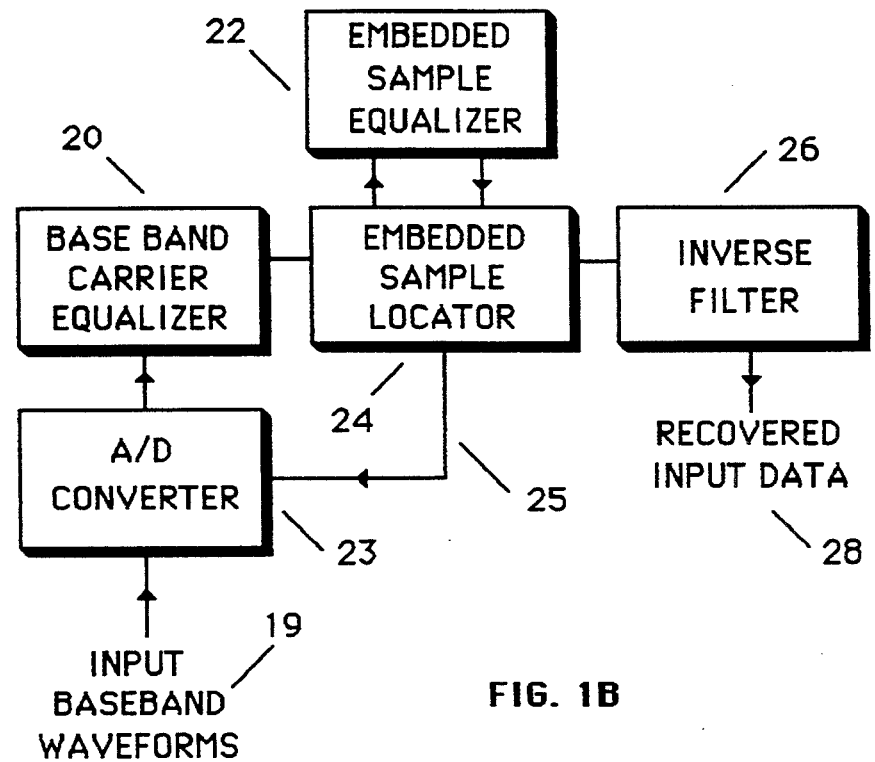

The invention is shown in block diagram form in FIGS. 1A-B. The modulator is comprised of a multilevel generator 12, a baseband modulator 16 and a composing function 14. The multilevel generator 12 converts the input data 10 to a multilevel signal. The baseband modulator 16 generates scaled versions of composing function 14 in accordance with the input from the multilevel generator 12. In one embodiment scaling is done by multiplication of the composing function by the input level. When predistortion equalization is used the composing function is usually changed, therefore it is convenient to store the composing function in ram memory, otherwise it can be stored in rom. The baseband modulator 16 sums the time shifted and scaled composing functions to generate the output baseband waveform 18. In baseband systems the baseband waveform 18 is then transmitted over the baseband channel, for example a voice grade telephone line, and arrives at the demodulator as input baseband waveform 19. In passband systems two baseband signals are used, referred to as the I and Q signals. These output baseband waveforms 18 are shifted up to the carrier frequency and at the demodulator shifted down to become input baseband waveforms 19. In passband systems with predistortion equalization dual composing functions 14 are used.

The composing function 14, in a conventional modulator might be a Nyquist pulse or a raised cosine pulse. One method of deriving the composing function used in this invention from a raised cosine pulse is discussed in connection with FIGS. 2A-F. The composing function is shown to contain a set of embedded samples whose Z transform has an inverse. When the embedded samples associated with a scaled value of the composing function are passed through this inverse a single pulse is generated at the output whose amplitude is dependent on the scaling factor applied to the composing function. It follows from the superposition property of linear systems that if two scaled composing functions are shifted in time relative to one another and added and the embedded samples in the sum passed through the inverse filter, the output will be two pulses separated in time whose relative amplitudes will depend on the original scaling.

The demodulator in FIG. 1B is comprised of the A/D converter 23, baseband carrier equalizer 20, embedded sample locator 24, embedded sample equalizer 22 and the inverse filter 26 which delivers the recovered input data 28. The baseband carrier equalizer is required in many passband and baseband systems, however, in some cases it may be possible to operate without this equalizer if the waveform distortion introduced by the channel is very small. If all the equalization is done by predistortion then no baseband carrier equalizer is required. The embedded sample locator 24 must locate the subset of samples which are the embedded samples. One way of accomplishing this requires a signal 25 which is fed back from the embedded sample locator to change the sample timing. This method and others are described in the operations section. The inverse filter 26, operates on the embedded samples producing a string of pulses whose amplitudes are related to the multilevel signals generated by the multilevel generator 12.

The equalizer 20 for passband systems described herein operates on the received I and Q baseband waveforms to remove the distortion and recover the transmitted I and Q baseband signals. The filters required for equalization are determined from the response of the channel to specified test signals. The analysis to determine the equalizer 20 is extended to determine the predistortion corn posing functions required when predistortion equalization is done at the transmitter. Indeed the analysis shows that the equalization can be put at either end or distributed between the transmitter and receiver. A baseband carrier equalizer which does all the equalization is called a full receiver equalizer. Similiarly a predistorton equalizer which does all the equalization is called a full predistortion equalizer.

After equalization and embedded sample location any remaining equalization errors can be cleaned up in the embedded sample equalizer 22. When there are residual errors the inverse filter output may have a prepulse and postpulse around the main pulse. A specific method of equalization which suppresses these side pulses is described in the operation section and is called embedded sample equalization. This equalizer can be combined by convolution with the inverse filter so that the side pulses are suppressed. A system where all the equalization is done by the embedded sample equalizer is referred to as full embedded sample equalization system.

OPERATION OF THE BASEBAND INVENTION

The composing function 14, of FIG. 1A is derived from the raised cosine 30 of FIG. 2A. The raised cosine, has a Z transform defined as H(z). The zeros of H(z) are shown in the Z plane 34 of FIG. 2B. Some of the zeros of H(z), are on the unit circle 35, such as the zero 36. Whenenever there are zeros of H(z) on the unit circle the function 1/H(z), called the inverse of H(z) cannot be determined. Therefore to create a function H(z) with an inverse each zero on the unit circle is replaced by a zero inside the unit circle distance r,39 from the origin and another zero outside the unit circle distance 1/r from the origin. This construction is shown in FIG. 2C. Here the pair of zeros 37 and 38 replace the zero 36 of FIG. 2B. The Z transform of the desired composing function is deduced by forming a polynomial in Z, in factored form, using all the zeros shown as 41 and multiplying these factors together to obtain the Z transform polynomial of the desired composing function. Composing function 40, shown in FIG. 2D is the result. The Z transform of this composing function will not have any zeros on the unit circle, and so this composing function will have an inverse. A subset of samples, from the composing function 40 is shown as 42 in FIG. 2E. This subset is comprised of every second sample from the composing function 40. These samples are termed embedded samples. Experience has shown that if the zeros of the composing function 40 are all off the unit circle, then the zeros of a Z transform HE(z) of the embedded samples 42 will be further off the unit circle. The zeros of HE(z) are shown as 44 in FIG. 2F.

Since the function HE(z) has all its zeros off the unit circle it has an inverse. The power series expansion of 1/HE(z) is the desired inverse. The power series will converge if there are no zeros on the unit circle. The rate of convergence is determined by the distance r,39 of FIG. 2C. The closer r is to the unit circle the greater will be the number of terms required in the inverse. A truncated power series represents an FIR filter and is the inverse filter if when convolved with HE(z) an impulse is generated.

Figure 3A:
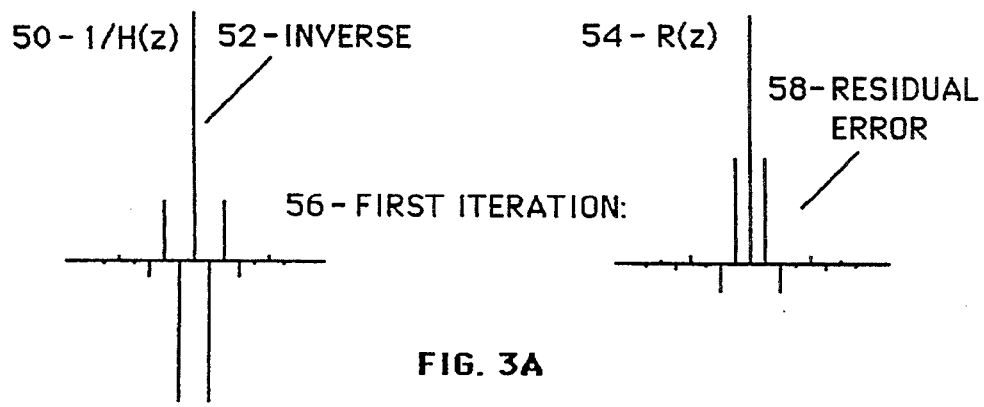
FIGS. 3A-C: Embedded Sample Equalization: Inverse Filter for the Baseband Channel.
Figure 3B:
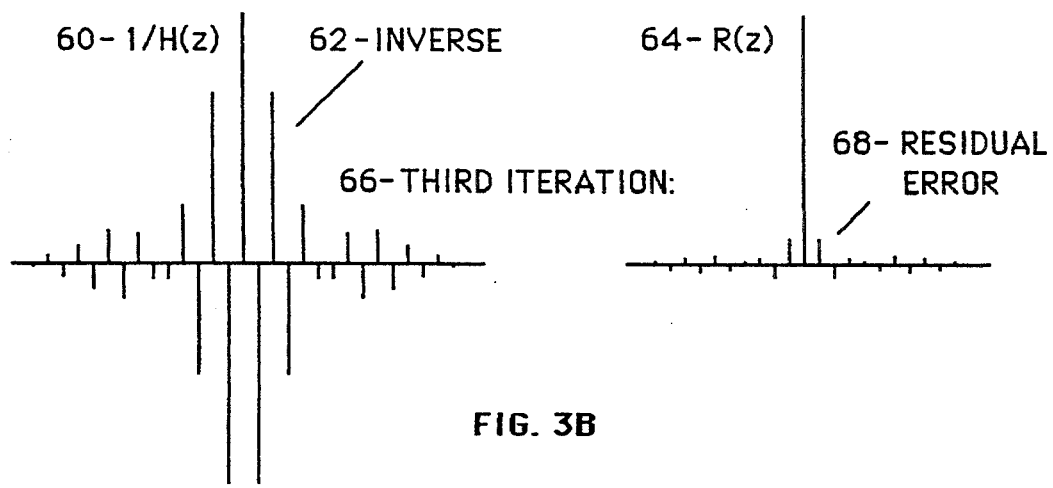
Figure 3C:
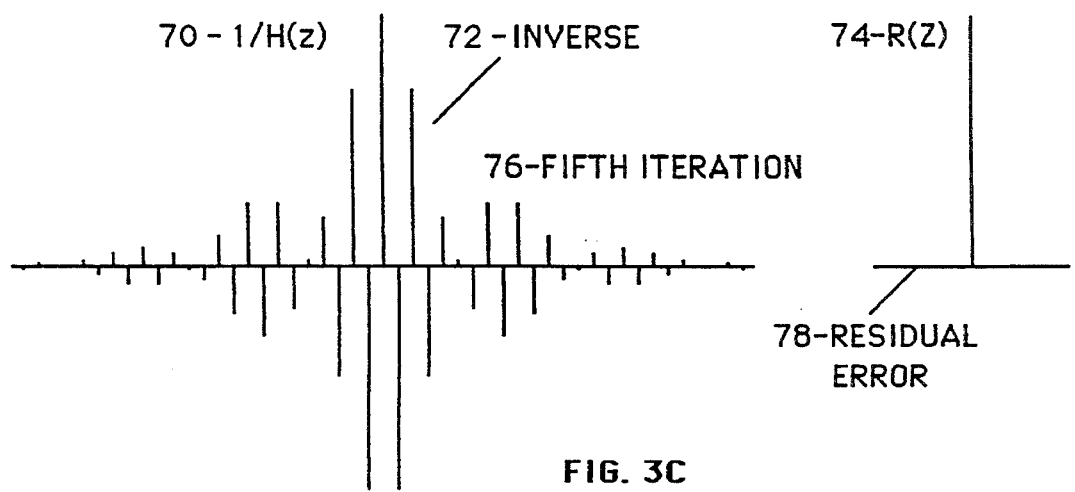

One method of generating the inverse is described in Edmunde E Newhall et al, A Technique for Finding Approximate Inverse Systems and its Application to Equalization: IEEE Tran on Communications Theory: December 1971. The method used here is a modification of this reference and is shown in FIGS. 3A–C.

The method involves finding a first estimate of the inverse and passing embedded samples 42, of FIG. 2E through this inverse and examing how close the result is to an impulse. The process is repeated until an impulse is obtained. FIG. 3A shows the inverse estimate 52 at the end of the first iteration 56. The convolution of the embedded samples 42, and the the inverse 52 is shown as R(z) 54, in FIG. 3A. The residual error 58 is measured by the number and size of the impulses surrounding the main pulse. The third iteration 66 and the fifth iteration 76 show decreasing residual errors 68 and 78 respectively. The inverse 72 is the desired result.

The operations performed to obtain the first estimate 52 of the inverse 72 are as follows. The peak and the samples to the right of the peak of the embeddedd samples 42 of FIG. 2E form a decreasing function. Call the Z transform of these samples MF(z). The zeros of such a function tend to be inside the unit circle in which case the inverse of MF(z) can be determined by long division and truncation. The samples to the left of the peak and including the peak form an increasing function. Use these samples to form a Z transform MR(z). Such a function tends to have all its zeros outside the unit circle. The inverse of MR(z) can be determined by time reversal, which moves all the zeros inside the unit circle, long division, truncation, and time reversal. The finest inverse estimate 52 was the convolution of the inverse of MF(z) and the inverse of MR(z). R(z) 54 is the result of passing the embedded samples 42 through the inverse 52. As long as the input function has no zeros on the unit circle it has been found by experience that this process will tend to reduce the size of the samples surrounding the main pulse. This is evident if R(z) 54 is compared with the embedded samples 42. For the second iteration the process was repeated with R(z) 54 as the input. The inverse of MR(z) and MF(z) were convolved with the inverse 52 to obtain a new inverse estimate. The embeddded samples 42 were then passed through this inverse to generate a new R(z). The third iteration used this new R(z) as the input, and so forth. In summary the inverse 72 of FIG. 3C when convolved with the embedded samples 42 of FIG. 2E generated the impulse 74 of FIG. 3C.

A simple example of the system shown in FIGS. 1A–B is shown in FIG. 4 and FIGS. 5A–C. Input binary bits 79 associated with the word Hah!,80 were generated (FIG. 4). This binary string was converted to the octal string 81. This octal string 81 represents the multilevel samples with levels from 0 through 7. Next a prepulse was added to the information portion of the wave consisting of pulse of amplitude 7 followed by 3 zeros, a pulse of amplitude 7 followed by two zeros. This signal with prepulse is shown as 82 in FIG. 4.

Although it is not an essential part of the invention it is advantageous to use positive and negative composing functions as this will tend to concentrate the power spectrum. The composing function sign is shown as 83 in FIG. 4. It is clear that the first three composing functions will have positive signs and after that the function will change sign with period 10. Since adjacent composing functions are separated by the embedded sample time, which in this case is twice the sample separation in the composing function, it follows that the generated baseband signal will have a fundamental frequency whose period is 20 sample times. In summary the baseband wave was generated by sending out scaled values of the composing function 40, scaled according to 82 in FIG. 4 and with signs generated in accordance with 83. A new scaled composing function was generated every two sample times and the baseband modulator 16 of FIG. 1 added the scaled and time shifted composing functions to generate the output wave.

Figure 5A:
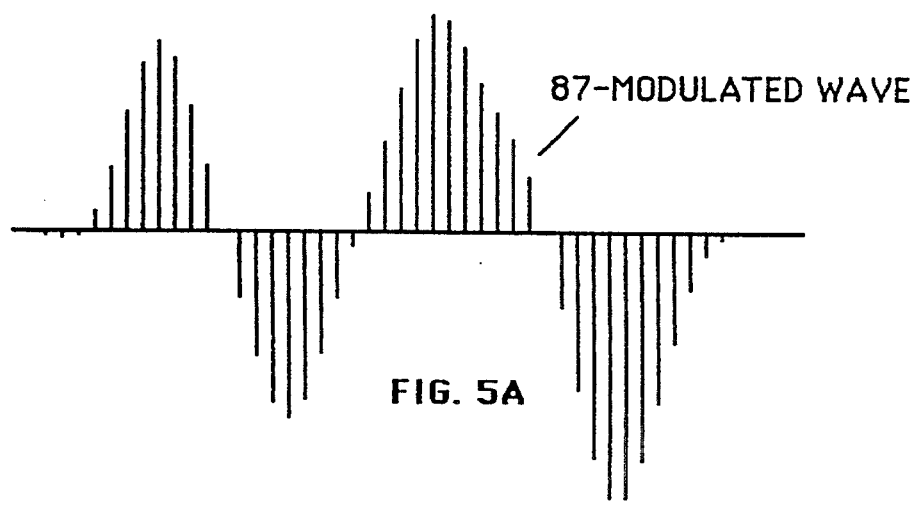
FIGS. 5A-C: Composing Function Generation of a Simple Waveform and Reception of the Simple Waveform Using an Inverse Filter.
Figure 5B:
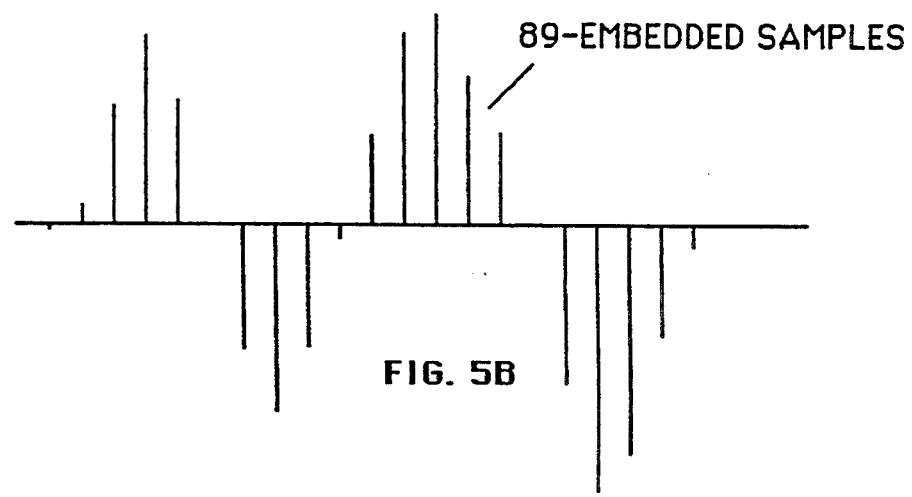
Figure 5C:
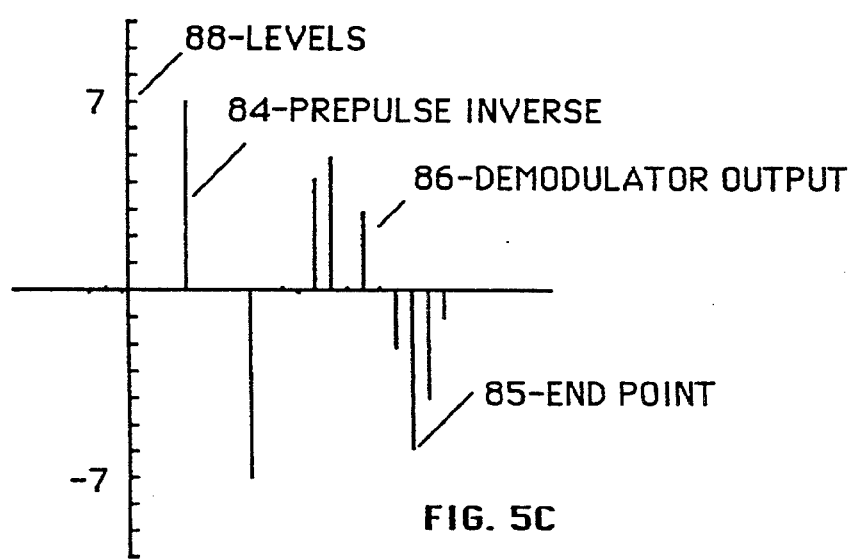

The modulated wave 87 is shown in FIG. 5A. At the receiver the embedded samples 89, in this case every second sample, have been extracted and are shown in FIG. 5B. These samples have been applied to the inverse filter 72 and the demodulator output 86 is shown in FIG. 5C. The allowed levels 88 are comprised of 7 positive levels, zero and seven negative levels. The prepulse inverse 84 establishes an amplitude reference at the receiver. It is clear that an output is generated every second sample time as expected, and the output levels, with associated sign, reproduce the encoded data 82, shown in FIG. 4.

The normal period of the modulated wave 87, excluding the positive and negative prepulses will be 20 sample times as discussed above. This period can also be estimated from FIG. 5A. During this period 10 information bearing impulses arrive each carrying 3 bits (8 levels) Therefore in one cyle of the modulated wave 87, 30 bits are transmitted thereby realizing a rate of 30 bits/hertz. QAM is regarded as the most bandwidth efficient classical modulation method. If 8 levels are allowed QAM will transmit 6 bits in one cycle, requiring 5 cycles to send the same information that is sent here in one cycle.

Figures 6A, 6B, 6C, 6D:
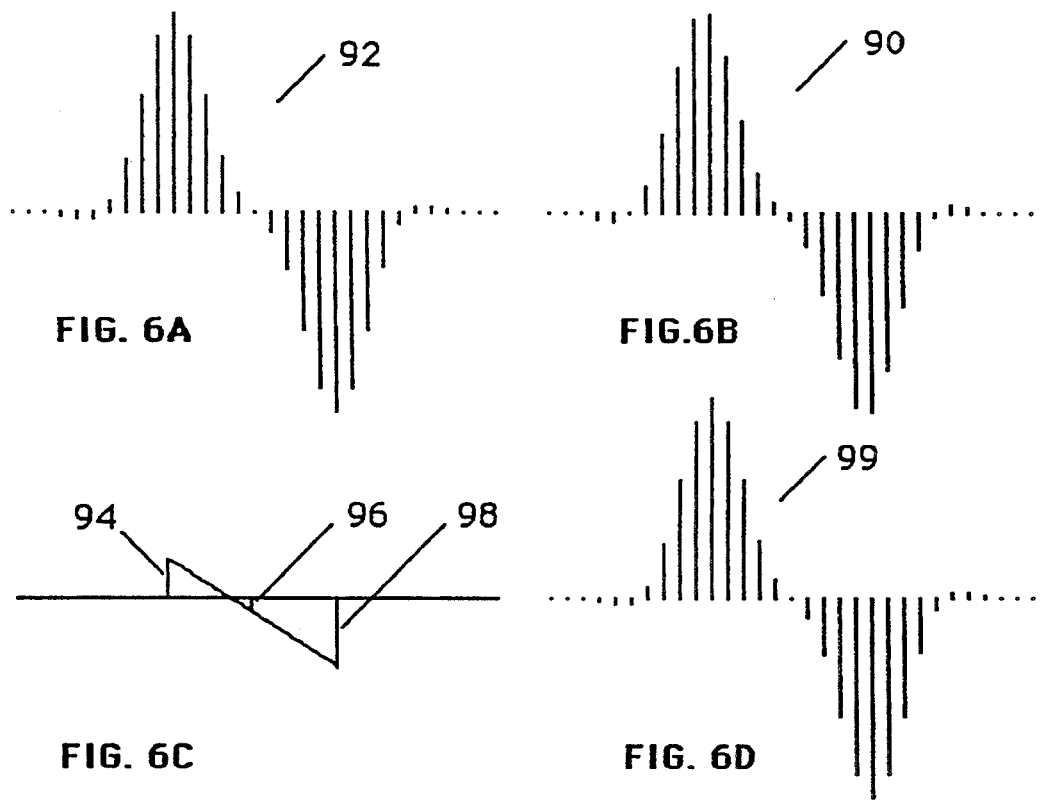
FIGS. 6A-D: Embedded Sample Location by Interpolation.

The embedded sample locator 24 of FIG. 1B must locate the embedded samples. One method involves preceding the information bearing portion of the wave with a bipolar pulse whose zero crossing defines a reference time position, and locating the scaled composing functions and therefore the embedded samples at a known time position from this reference. The input baseband waveform 19, in FIG. 1B will usually be a continuous wave and after sampling a bipolar prepulse 90 might appear as shown in FIG. 6B. If the continous wave had been sampled at the zero crossing the sampled bipolar pulse would have the samples shown as 92 in FIG. 6A. It is necessary to determine the time shift required to recover samples of of this type. This time shift must then be applied to the information bearing portion of the wave to establish the value of the embedded samples. Some form of interpolation is required. Since the discrete fourier transform (DFT) was used for signal processing an interpolation technique based on the DFT was chosen as it minimized the signal processing required.

The DFT and IDFT are given in Rabiner and Gold as:

$$X_p(k) = \sum_{n=0}^{N-1} x_p(n)e^{-j(2\pi/N)nk} \quad (1)$$

$$x_p(n) = 1/N \sum_{k=0}^{N-1} X_p(k)e^{j(2\pi/N)kn}$$

In the usage here $x_p(n)$ is a real periodic sequence and $X_p(k)$ is a complex pair for every frequency k.

Interpolation is accomplished by relating the DFT to the standard fourier transform. The exponential term in the DFT above has a corresponding term in the direct fourier transform of the form $$e^{-j\omega t} \quad (2)$$

Whenever the fourier transform is applied to samples from a continuous function, time and frequency are quantized. In this case relation (2) above becomes $$e^{-j2\pi k \Delta f n \Delta t} \quad (3)$$

where $\Delta f$ and $\Delta t$ are real time and frequency increments. The exponential form above becomes the same as the exponential form in the DFT if $$\Delta f \Delta t = 1/N \quad (4)$$

In the application to voice grade telephone lines which follows $\Delta f$ is taken as 100 cycles and $\Delta t$ is taken as 50 microseconds. This gives a value for N of 200. To perform interpolation the DFT of the samples from the continous wave was determined. It is easy to show this amounts to finding the direct fourier transform with the values of $\Delta f$ and $\Delta t$ given above. If the IDFT is now taken the original samples will be recovered.

Consider finding the IDFT with n taking on an offset from the integer values of 1,2 ... etc.

It is easy to show that this amounts to taking the inverse fourier transform at a time point offset from the existing samples. For example if n in the IDFT takes on a value of 1.40 then the IDFT will provide an interpolated value of the samples at a point 40 percent of of the way between the first and second sample.

The application of this interpolation method is illustrated in FIG. 6C. The smallest sample of waveform 90 of FIG. 6B was located. The DFT of the waveform, made up of the smallest sample and 15 samples on either side, was determined. Next the offset in the sample point was estimated which would make the sample 98, following the smallest sample 96, the same size as the sample 94. This is a simple linear interpolation as shown in FIG. 6C. The IDFT was then used to determine the value of the samples on either side of the smallest sample using the estimated offset. The process was repeated until the samples on either side of the smallest sample were equal. In this case the process involved 6 estimates −0.532, −0.336, −0.432, −0.384, −0.408, −0.396. These values converge on the shift of +0.40 used to generate the samples 90 from samples 92. The IDFT with an offset of −0.396 was then evaluated for all the samples and the result is shown as 99 in FIG. 6D. This is a very good approximation to the samples 92 of FIG. 6A.

To evaluate the embedded samples in the following information portion of the wave the DFT of a wave segment is first determined then the I DFT determined using the established offset value. Alternatively knowledge of the offset can be used to change the sampling time of the input A/D converter 23 of FIG. 1B using feedback loop 25. In this case no interpolation of the information bearing portion of the wave is required.

The offset can also be determined by applying the techniques described above to locate the peak of a single pulse. An offset is determined which makes the pulses on either side of the peak the same size. These techniques for extracting the embedded sample streams will be referred to collectively as offset determination and application. Application implies applying the established offset to the information portion of the wave and extracting the interspersed embedded samples.

In cases where a prepulse is not available the embedded samples can be determined by other methods. Eye patterns are a common method of sample point adjustment; for example see Lee/Messerschmitt. In FIG. 5C the end point 85 of the output sample will tend to lie substantially on the desired output level if sampling is done when an embedded sample is present. If the sampling point is moved away from the embedded samples the end points will move away from the desired levels and the eye is said to close. It follows that a systematic adjustment of the sampling time followed by examination of the eye pattern and continued adjustment until the eye is open will locate the embedded samples. This method of establishing the offset requires a string of data and some of the data will be lost while the sampling time is adjusted to open the eye. A variant of this approach uses a fixed segment of the signal stored in memory. The interpolation technique described above can be used to establish sets of samples. Each of these sets will have a fixed offset from the given samples. The sets are passed through the inverse filter. The offset associated with the set which creates the largest eye opening is the offset to be used. These approaches which use the eye pattern to locate the embedded samples will be referred to as embedded sample location by eye pattern adjustment and application.

EQUALIZATION OF THE BASEBAND CHANNEL

The inverse filter 26 of FIG. 1B operates on the set of embedded samples to recover the encoded information. It follows that the equalizer must remove any signal distortion introduced in the embedded samples by the transmission medium. The equalization method described here acts to remove distortion on the total baseband wave thereby removing distortion of the embedded samples.

A baseband carrier equalizer 20 of FIG. 1B is described using a voice grade channel as the transmission medium. Although described using a specific medium the method is applicable to any baseband channel.

Figure 7A:
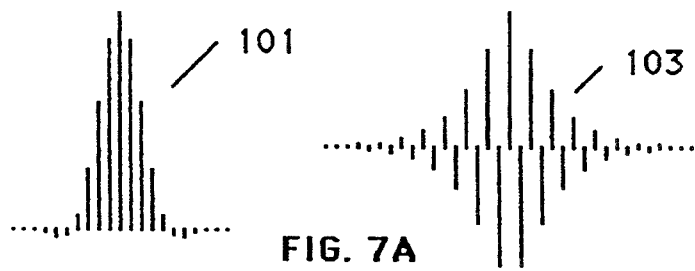
FIGS. 7A-C: Transmission and Reception of a Random Wave Using a Composing Function and an Inverse Filter.
Figure 7B:
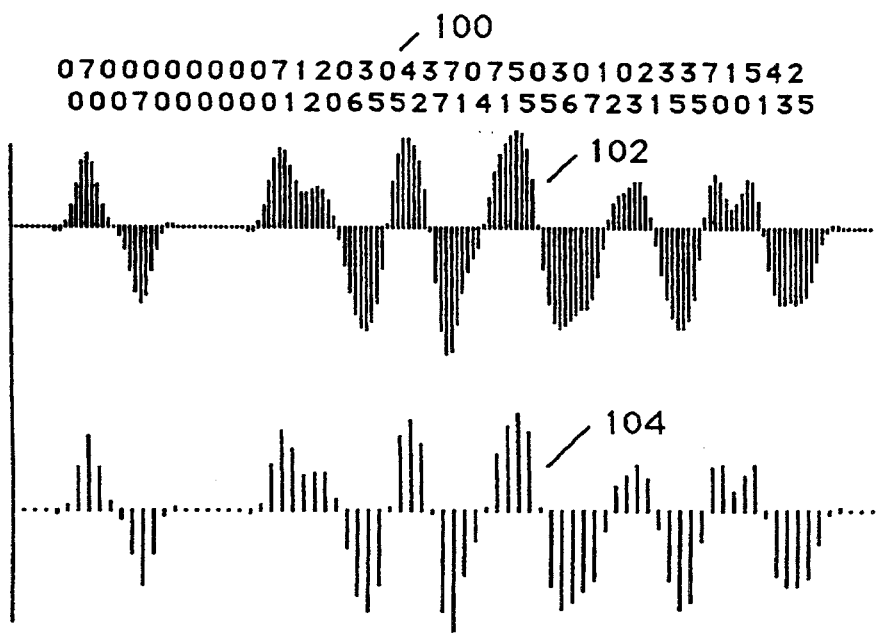
Figure 7C:
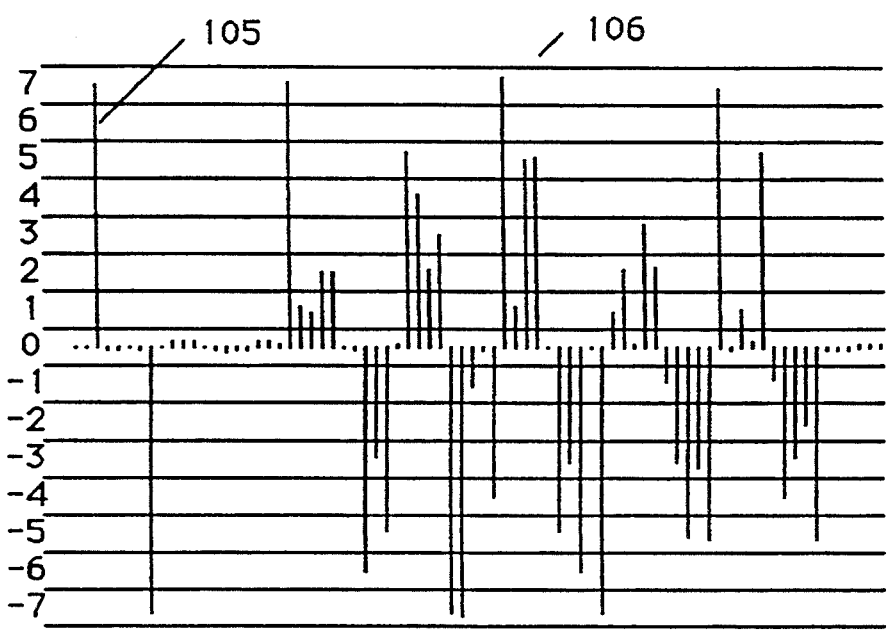

A composing function 14 of FIG. 1A is shown in sample data form as 101 in FIG. 7A. The inverse filter 26 of FIG. 1B is shown in sample data form as 103. In finding the inverse filter from the embedded samples the distance r, 39 in FIG. 2C, was assigned the value 0.70. FIG. 7B shows a random wave 102, generated by the baseband modulator 16 of FIG. 1A by scaling and addition. The modulation values 100 were used in generating the random wave 102. Embedded samples 104 from the random wave are shown in FIG. 7B. FIG. 7C shows the recovered samples 106 generated by passing the embedded samples through the inverse filter 103. The recovered samples 106 clearly recover the modulation values 100. The number of bits/hertz is 30 as discussed previously. This can be confirmed by observing that 150 bits are transmitted in the 5 cycles of the random wave 102.

Figure 8:
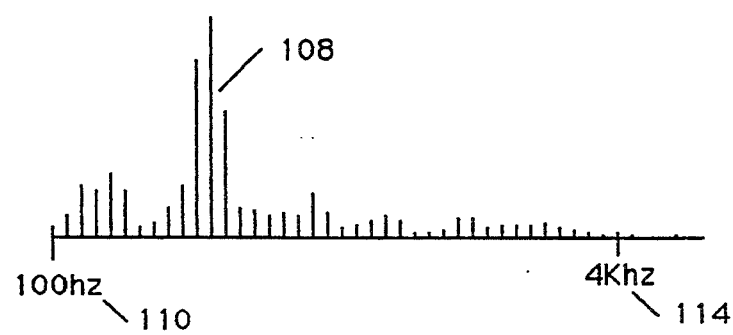
FIG. 8: Power Spectrum of the Random Wave Required for Spectral Estimates.

The fundamental frequency of the random wave 102 was chosen as 1000 hertz. Since there are 20 samples in one cycle, the time between samples $\Delta t$ is 50 microseconds. $\Delta f$ was chosen as 100 cycles therefore from equation(4) $N=1/\Delta f^*\Delta t=200$. Using this value of N the DFT of the random wave 102 was determined using the first of equations(1). The power spectrum 108 associated with this DFT is shown in FIG. 8. The power spectrum is formed by taking the square root of the sum of the squares of each complex term in the DFT.

From FIG. 8 it is estimated that an equalizer would likely reproduce the random wave 102 if equalized from 100 cycles,110 to 4 Khz,114. This is a first estimate and can be confirmed after testing on the random wave.

Consider representing the random wave 102 by the Z transform X(z). Represent the voice grade channel by H(z) and the output response when X(z) is applied to H(z) by Y(z). Then $$Y(z)=H(z)X(z) \qquad (6)$$

$$X(z)=Y(z)(1/H(z)) \qquad (7)$$

$$H(z)=Y(z)/X(z) \qquad (8)$$

Equation(7) is a classic relationship which states that given the distorted signal Y(z) the input X(z) can be determined by multiplying the distorted signal by $1/H(z)$. Since every set of samples represented by a Z transform has a DFT, the inverse of H(z) represented by $1/H(z)$ is determined by finding the DFT of the samples, then for each frequency evaluating the reciprocal of the associated complex term. In most cases once calculation is initiated in the DFT domain it is usually convenient to multiply and add DFT's to evaluate relationships expressed in Z transform form.

Before inverting H(z) consider measuring H(z) using equation(8). The operations to be performed are then; apply a signal X(z), measure the response Y(z), invert X(z), multiply by Y(z). FIGS. 9A-E shows these operations in the DFT domain, Here the scale 123 is 100 hertz/div. The applied signal X(z) is shown as 116. The power spectrum of the DFT of this signal is shown as 118. The power spectrum of the DFT of Y(z) is shown as 120. The DFT of Y(z) was determined by multiplying the DFT of X(z) by the DFT of a known telephone line whose frequency and phase were known in 100 hertz increments from 100 hertz to 4 Khz. The inverse of the DFT of X(z) was then multiplied by the DFT of Y(z) to obtain the DFT of the channel whose power spectrum is shown as 122. Finally the DFT of 1/H(z) was found by inverting the DFT of the channel. The power spectrum associated with the DFT of the inverse is shown as 124. In practice the DFT of Y(z) is determined by digitizing the response Y(z) and finding the DFT of this response. This response will usually be an extended damped ringing signal.

The applied signal 116 has a period of 10 samples therefore a fundamental frequency of 2000 hertz. This is confirmed in FIG. 9B where the power spectrum 118 of the DFT has a peak in the neighborhood of 2000 hertz. The applied signal has a significant frequency content at all the frequencies in the range of interest from 100 cycles to 4 Khz. This is important if inversion is to be accomplished easily.

Figures 9A, 9B, 9C, 9D, 9E:
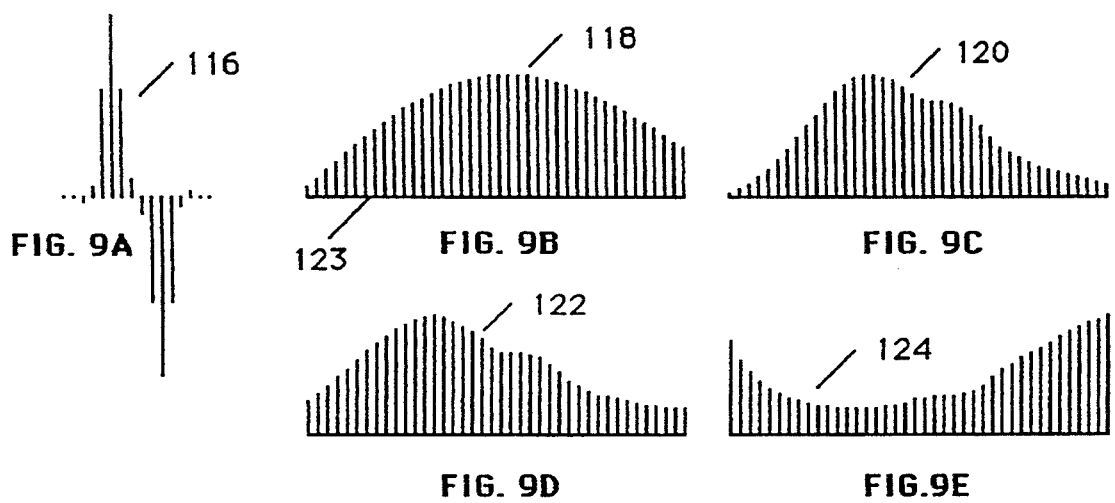
FIGS. 9A-E: Channel Response Measurement: Construction of a Baseband Carrier Equalizer for a Baseband System.
Figure 10A:
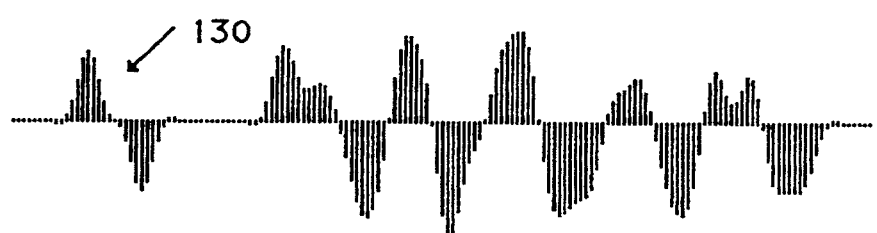
FIGS. 10A-C: Equalization of a Baseband Signal by a Baseband Carrier Equalizer.
Figure 10B:
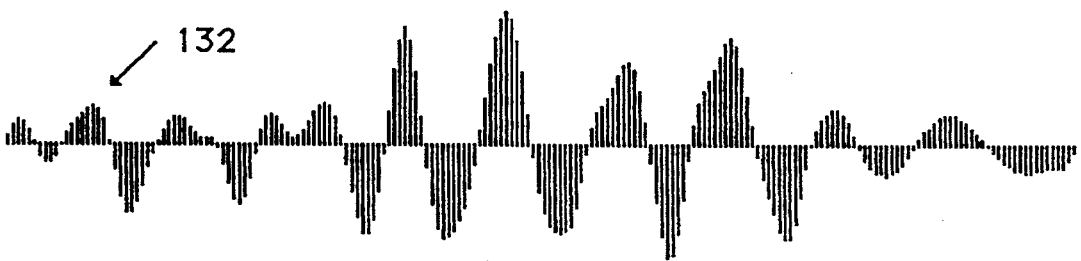
Figure 10C:
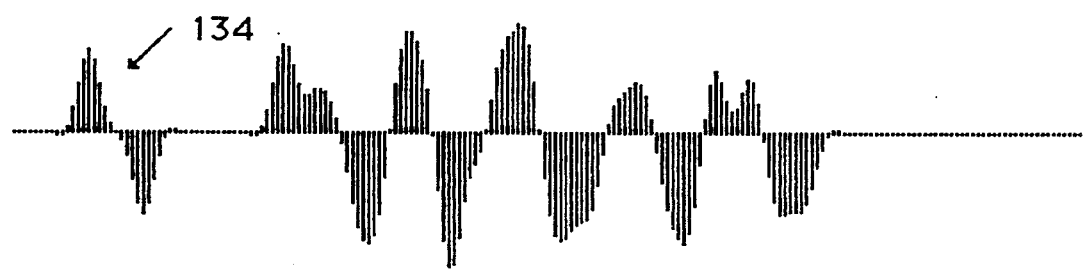

FIGS. 10A-C shows the performance of the equalizer whose power spectrum is shown as 124. The standard test wave 102 of FIG. 7B is reproduced as 130 in FIG. 10A. Waveform 130 is the signal applied to the channel whose DFT has the power spectrum 122 of FIG. 9D. The signal received at the output of the channel is shown as 132 in FIG. 10B. Waveform 134 is the output after applying the equalizer whose DFT has the power spectrum 124 of FIG. 9E to the received signal 132. A comparison of 130 and 134 indicates the equalizer has removed substantially all the distortion introduced by the channel. Equalizers of this kind are usually employed at the receiver. Consider achieving equalization at the transmitter by predistorting the composing function so the signal arriving at the receiver is undistorted.

The composing function 101 of FIG. 7A is to be predistorted so as to arrive at the receiver in undistorted form. Represent this composing function by X(z) and consider the equality $$X(z)=(X(z)(1/H(z))H(z)$$

This can be interpreted to say that the signal $X(z)(1/H(z))$ will arrive at the receiver undistorted when passed through the channel H(z). The DFT of $1/H(z)$ is known. Its power spectrum is shown as 124 in FIG. 9E. The DFT of the composing function 101 of FIG. 7A can be found, however these DFT's cannot be multiplied together as the DFT of $1/H(z)$ is not defined at zero frequency and the DFT of the composing function 101 of FIG. 7A has a DC component. The solution to this problem is shown in FIGS. 11A-D.

The composing function 140, referred to as a dipulse, is used in place of composing function 101. Composing function 140 is made up of two superimposed functions of the same shape as 101, separated by 10 sample intervals with the second pulse inverted, When waves were generated using 101 a sign reversal was introduced every 10 sample intervals. It follows that the composing function 140 when used in a first time slot will introduce into a following slot the proper shape of signal for that slot; the proper sign but not likely the proper amplitude. When composing function 140 is used to generate the signal in the following slot, the signal previously introduced is considered, and the scaling value modified so the amplitude required in the following slot is generated. This procedure is repeated for all the required time slots. The generated wave usually has a non-information-bearing tail. Waveform 142 was generated in this manner. With the exception of the non-information-bearing tail it is the same as waveform 102 of FIG. 7B.

Figure 11A:
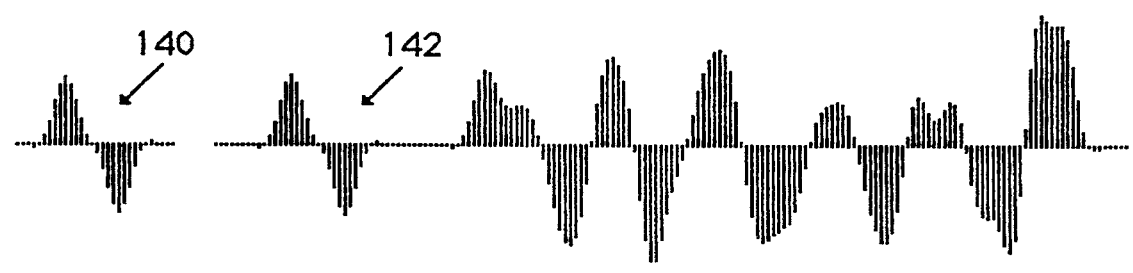
FIGS. 11A-D: Predistortion Equalization of the Baseband Channel Using a Dipulse Composing Function.
Figure 11B:
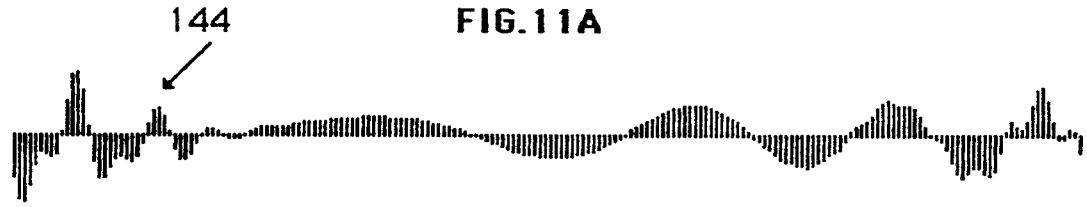
Figure 11C:
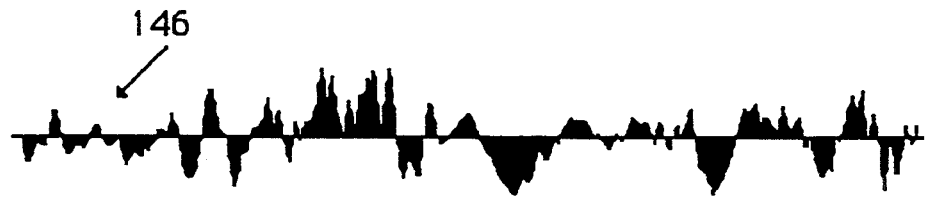
Figure 11D:
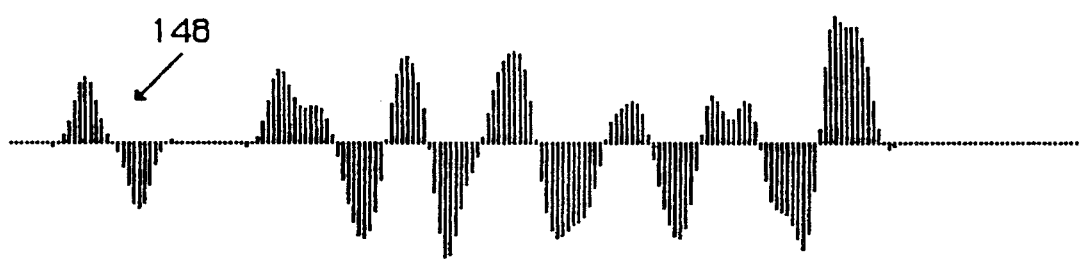

The composing function 144 of FIG. 11B was obtained by multiplying the DFT of 140 by the DFT of the inverse of H(z) whose power spectrum is shown as 124 in FIG. 9E and taking the IDFT. This multiplication is now possible and meaningful as the spectrum of 140 acts to truncate the spectrum of 124 when multiplication is performed. Waveform 146 was generated using composing function 144, with scaling and addition according to the modulation shown as 100 in FIG. 7B. Finally the signal 146 was passed through the channel whose spectrum is shown as 122 of FIG. 9D. The waveform which arrives at the receiver is shown as 148 in FIG. 11D. Comparison with waveform 142 which is the undistorted signal shows that the arriving waveform is substantially undistorted.

Although the waveform 148 arrives substantially undistorted this example illustrates the possibility of time domain aliasing; see Rabiner and Gold. The waveform 144 is 200 samples long and N=200. Furthermore waveform 144 does not show any region where the value is effectively zero.

In practice, aliasing can be avoided by the choice of $\Delta f$ used in analyzing the time response when the channel characteristic is being measured. From equation(4) it is clear that if $\Delta f$ is made smaller then N will be larger, providing more samples in the IDFT for the time response to decay. This option was ruled out in this example as the voice channel data was available at fixed frequency increments of 100 hertz.

FIGS. 10A–C demonstrates baseband carrier equalization at the receiver using the DFT whose power spectrum is 124 of FIG. 9E. FIG. 11 demonstrates how to perform predistortion equalization, the composing function being determined from this same DFT. Splitting the equalization between the transmitter and receiver is accomplished by expressing each vector component of this DFT as the product of two vectors. For example consider splitting the equalization equally between the transmitter and receiver. If this DFT has a term represented by r and $\theta$ at a particular frequency then the component filters will both be the same with component $\sqrt{r}$ and $\theta/2$. The predistortion composing function at the transmitter will be generated as described previously but with this new filter.

Baseband carrier equalization as described above is supplemented by the embedded sample equalizer 22 of FIG. 1B. The random wave 142 of FIG. 11A has at the start of the wave a prepulse of the type 140. The embedded sample equalizer operates on the distortion of this prepulse after passage through the inverse filter. FIG. 7C pulse 105 shows the shape of this prepulse after passage through the inverse filter. When residual equalization is required there will be small samples before and after the pulse 105. Since the pulse 105 is made up of the sum of two identical waves it is easy to split it into the sum of a positive pulse and a negative pulse. This positive pulse will appear much the same as 64 in FIG. 3B showing the residual error 68. The process described in connection with finding the inverse filter can be applied to find a filter which will reduce this residual error. This filter can be convolved with the inverse filter. This equalization can be regarded as a fine tuning of the inverse filter. In summary, the procedure described in FIGS. 3A–C to find the inverse filter is the procedure required to implement the embedded sample equalizer 22.

In the example of FIGS. 7A–C a 1000 hertz baseband wave was used with 8 levels and a rate of 30 kilobits/sec was achieved. The standards for Voice Band Modems described in CCITT Recommendations V.32 bis, Data Communications Over the Telephone, describes various forms of Trellis coding to permit reliable transmission of more levels. If 32 levels are transmitted then one can expect to receive 16 levels reliably on some voice grade lines. If Trellis coding is applied in the same way here the rate would be 40 kilobits/sec. If the baseband carrier is increased to 1600 hertz then the rate would be 64 kilobits/sec.

OPERATION OF THE PASSBAND INVENTION

The use of the invention in Digital Cellular Systems is described. It will be clear the invention can be applied as described to any passband system which uses a linear modulation method, i.e. the frequency shifts up to the carrier and down from the carrier to to baseband are accomplished by multiplication and filtering.

FIGS. 1A–B has been used to describe the baseband invention. The same diagram is used to describe the passband invention. In the passband case two output baseband waveforms 18 referred to as I and Q are generated by the baseband modulator 16 of FIG. 1A. At the receiver the two baseband waveforms 19 are received. In the passband case the problems of embedded sample location and equalization have solutions analogous to the solutions in the baseband case.

Figure 12:
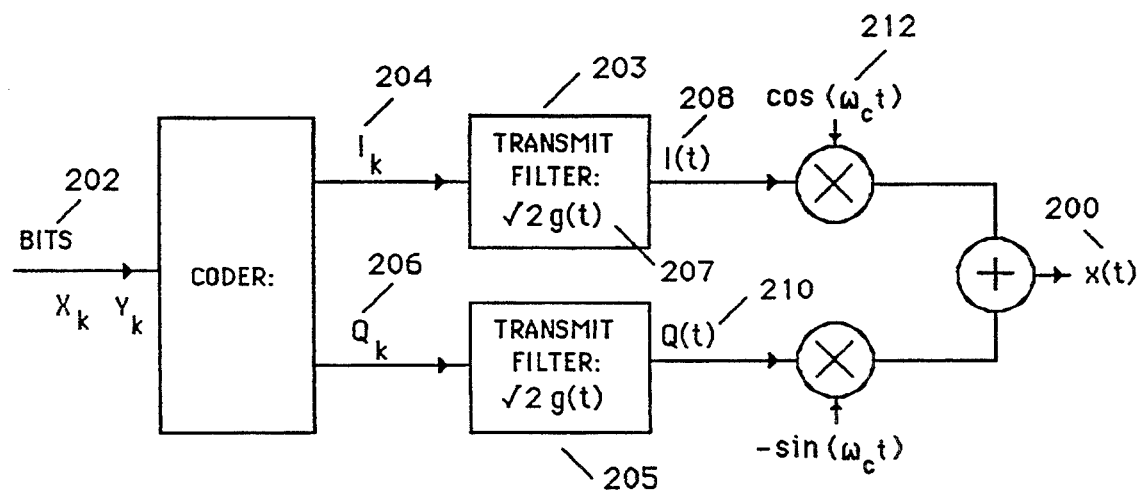
FIG. 12: Modulator for the I and Q Channel of a Passband System.

A standard modulator, as described in Lee/Messerschmitt, is shown in FIG. 12. This standard modulator is used to generate the modulation for Digital Cellular, referred to as $\pi/4$ shifted, differentially encoded, quadrature phase shift keying(DQPSK).

In the implementation used here the baseband signal I(t),208 is generated by adding scaled and time separated versions of a composing function related to g(t),207, the scaling being determined by the value of $I_k$ 204. This implements the transmit filter 203. Q(t),210 is generated in a similiar manner, the scaling being determined by $Q_k$ 206. It will be shown that predistortion equalization, analogous to that described for baseband, can be accomplished by tasking the transmit filter, 203 different from the transmit filter 205. In this invention this is accomplished in practice by making the composing function associated with the transmit filter 203 different from the composing function associated with the transmit filter 205. In a standard Digital Cellular system the same composing function is used in both channels and will be referred to as G(z). Consider first the use of the modulator of FIG. 12 to generate a standard Digital Cellular signal, and the recovery of the encoded data at the receiver.

The transmitter shown in FIG. 12 accepts bits 202. These bits are encoded two at a time and determine a value for $I_k$, 204 and $Q_k$, 206. The transmitter filter 203 then generates an output I(t) 208 given by $$I(t) = \sqrt{2}\, I_k\, g(t)$$

and similiarly for the Q channel. I(t), 208 and Q(t), 210 are then shifted in frequency to the carrier frequency $\omega_c$, 212 by multiplication, and added to generate the real time signal x(t) 200. This x(t) arriving at the receiving antenna is shifted down to baseband by multiplication and filtering to recover I(t) and Q(t).

Digital data sequences are encoded as shown below:

$$I_k = I_{k-1} \cos[\Delta\Phi(X_k, Y_k)] - Q_{k-1} \sin[\Delta\Phi(X_k, Y_k)]$$

$$Q_k = I_{k-1} \sin[\Delta\Phi(X_k, Y_k)] - Q_{k-1} \cos[\Delta\Phi(X_k, Y_k)]$$

$X_k$ and $Y_k$ represent the input data and the $I_k$ and $Q_k$ represent the peak amplitude of I(t) and Q(t) respectively.

$X_k$ and $Y_k$ are related $\Delta\Phi$ by the following encoding/decoding table:

| $X_k$ | $Y_k$ | $\Delta\Phi$ |
| --- | --- | --- |
| 1 | 1 | $-3\pi/4$ |
| 0 | 1 | $3\pi/4$ |
| 0 | 0 | $\pi/4$ |
| 1 | 0 | $-\pi/4$ |

From the above it is clear each incoming pair $X_k$, $Y_k$ is associated with a unique phase change. It is also clear that the next value of $I_k$ and $Q_k$ depends on the values of $I_{k-1}, Q_{k-1}$.

Figure 13:
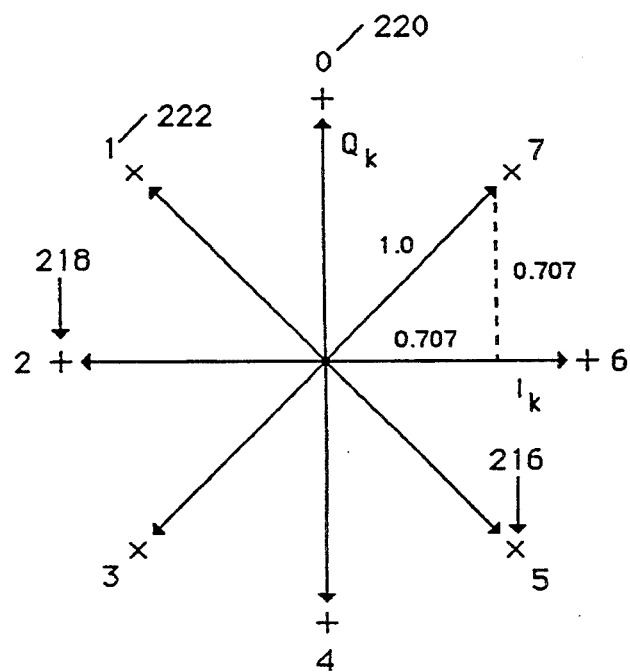
FIG. 13: Signal Constellation Used in Digital Cellular.

The channel coding is summarized in a different form in FIG. 13. Here transitions can take place from any of the + states 218 to any of the x states 216 and vice versa. The amplitude of $I_k$ and $Q_k$ for any state is given by the coordinate axes. For example in state 0, 220, $I_k=0$, $Q_k=1$, and in state 1, 222, $I_k=-0.707$, $Q_k=0.707$. Suppose at an initial time the system is in state 0 and one symbol time later the system is in state 1, then the phase change is $\pi/4$ and from the encoding/decoding table it is clear a 0,0 has been transmitted.

It follows that for demodulation the peak value of I(t) and Q(t), ($I_k$ and $Q_k$) are determined thus providing the entry point into FIG. 13. $I_{k+1}$ and $Q_{k+1}$, the peaks at the subsequent symbol time, are then determined to establish the next state. The angle between the two states serves as an entry point into the encoding/decoding table to determine the transmitted data.

In summary demodulation involves determining an angle associated with state 0 and a second angle associated with state 1, followed by a table lookup to determine the transmitted data. The vectors in FIG. 13 form a signal constellation, and demodulation involves finding the angle between the vectors.

In the Digital Cellular Standard, the filter g(t),207 in FIG. 12 is specified in the frequency domain. In the implementation used here this frequency specification must be transformed into an equivalent time domain function. The frequency specification from the Digital Cellular specification IS-54 is:

$$H(f) = 1 \ldots \text{for} \ldots 0 \leq f \leq (1-\alpha)/2T$$

$$H(f) = \sqrt{0.5(1 - \sin[(\pi/2\alpha)(2fT - 1)])} \ldots \text{for} \ldots (1-\alpha)/2T \leq f \leq (1+\alpha)/2T$$

$$H(f) = 0 \ldots \text{for} \ldots f > (1+\alpha)/2T$$

Here T is the symbol period and $\alpha=0.35$ is the roll-off factor. The symbol rate in Digital Cellular is 24.3 kilosymbols/second.

Figure 14:
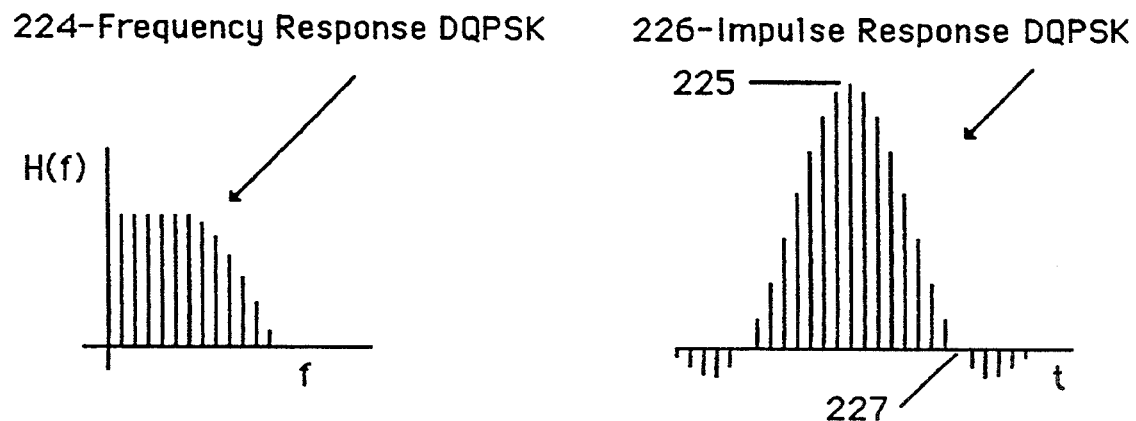
FIG. 14: Composing Function Generation from the Frequency Specification in Digital Cellular.

This frequency response 224 is plotted in FIG. 14. The impulse response G(z),226, associated with this frequency response is shown in FIG. 14. G(z) is derived from the frequency response by taking the inverse Fourier transform. In practice the baseband signal I(t),208 in FIG. 12 is generated by adding scaled values of G(z) scaled according to $I_k$,204. Q(t),210 is generated in a similiar manner. Scaled values of G(z) can be stored in ram or rom memory. Ram memory is used when the baseband signal is to be predistorted to achieve predistortion equalization as will be discussed in the equalization section.

In practice, in Digital Cellular, successive symbols are transmitted so that the peak of one corresponds to the zero crossing of the preceding symbol. It is clear from FIG. 14 that the peak 225 and zero crossing 227 of G(Z) are separated by eight sample intervals. Therefore, in the absence of transmission distortion, symbols separated by eight sample intervals will not have any intersymbol interference, i.e samples taken at the peak will not have any contribution from adjacent symbols. In the invention described here the symbols are placed closer together than eight sample intervals thereby achieving a higher bit rate, as will be described.

In summary a standard Digital Cellular system can be implemented using the system shown in FIGS. 1A-B. The composing function for the I and Q baseband channels is G(z),226 of FIG. 14. Values of G(z) are scaled according to $I_k$ and $Q_k$, the scaled values are separated by eight sample intervals and the scaled values are added to generate the I and Q waves. At the receiver the samples associated with the peak of G(z) are located, then the decoding operation can proceed as described in connection with FIG. 13

Figure 15:
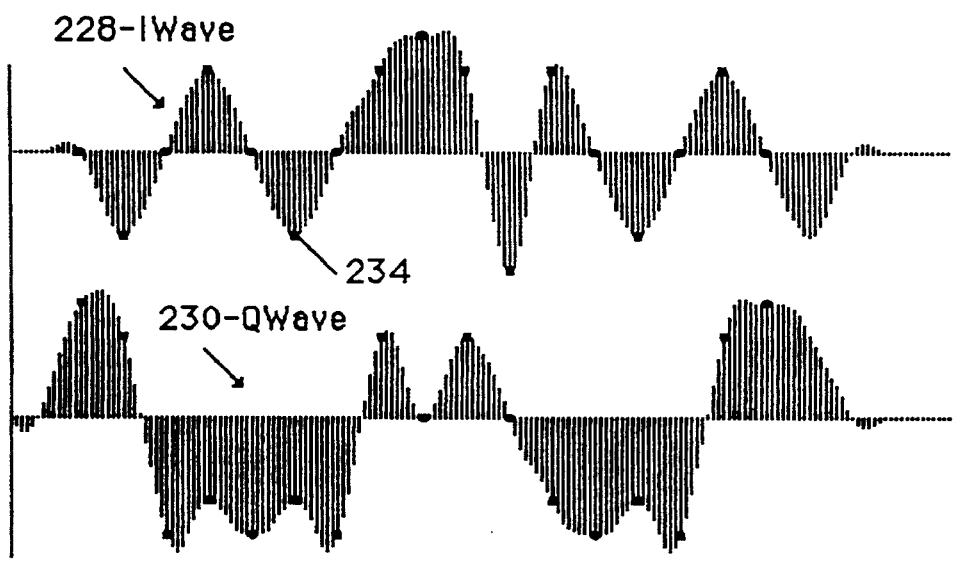
FIG. 15: Encoding of Simple I and Q Channel Baseband Waves for Digital Cellular.

Generation of a typical modulated wave as used in Digital Cellular is shown in FIG. 15. Here "Hah!" is encoded in DQPSK format. First the bits $X_k, Y_k$ to be transmitted were determined from the ASCII characters. Then a sequence of $I_k$ and $Q_k$ values was determined from FIG. 13. These values of $I_k$ and $Q_k$ were used to scale G(z) and the scaled values added to generate the IWave 228 shown in FIG. 15. The QWAve, 230, is shown in FIG. 15.

Consider the IWave and QWave of FIG. 15 to be the waves received at the receiver after modulation and demodulation. Assume the waves have been sampled at the peaks of the scaled composing functions. One sample of this sample set is shown as 234 in FIG. 15. If the largest sample is taken to have a magnitude of 1.0 their smaller non zero samples will be found to have a magnitude of 0.707. These samples can be used to establish values of $I_k, Q_k$ and $I_{k+1}, Q_{k+1}$ and using FIG. 13 the modulation can be recovered.

In the passband invention described here the composing function G(z) is first modified as shown in FIGS. 16A-F. The procedure is analogous to that used in the baseband case as described in connection with FIGS. 2A-F.

Figure 16A:
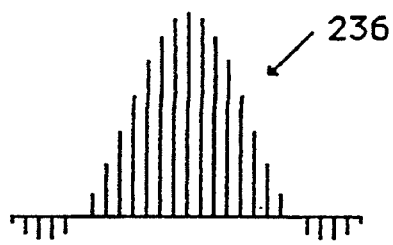
FIGS. 16A-F: Construction of a Composing Function with Embedded Samples and an Inverse Filter for a Passband System.
Figure 16B:
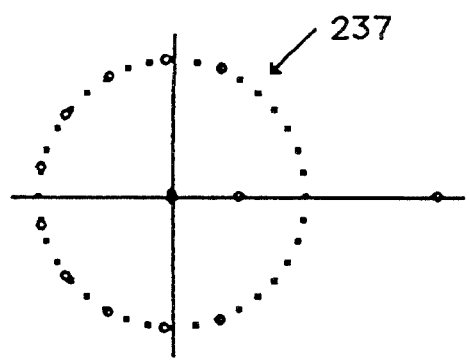
Figure 16C:
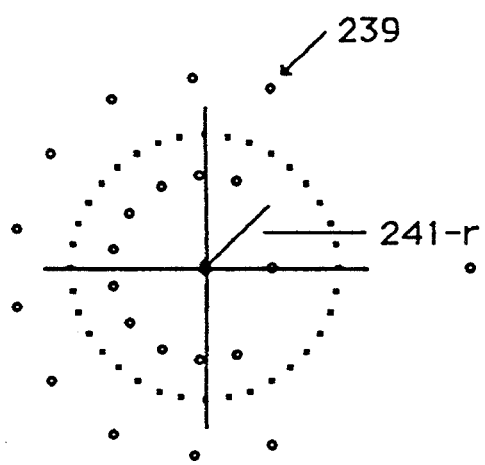

The composing function 236 in FIG. 16A has a Z transform G(z). The zeros of this Z transform are shown as 237 in FIG. 16B. The zeros moved off the unit circle are shown as 239 in FIG. 16C. Each zero is replaced by a pair of zeros, the zero inside the unit circle being distance r,241 from the origin and the zero outside the unit circle being distance 1/r from the origin. These zeros are used to form a polynomial in factored form. The factors are multiplied together to form a Z transform whose samples are shown as 238. This composing function 238 is used as the composing function for the I and Q channels of the system in FIGS. 1A-B. A set of embedded samples 240 chosen from the composing function 238, is shown in FIG. 16E. The inverse of these embedded samples is shown as 242 in FIG. 16F. This inverse is used in the received I and Q channels of FIG. 1B as the inverse filter 26.

Figure 16D:
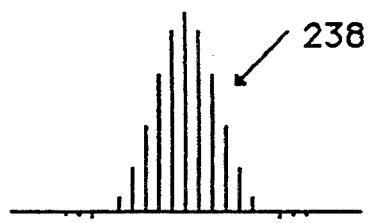
Figure 16E:
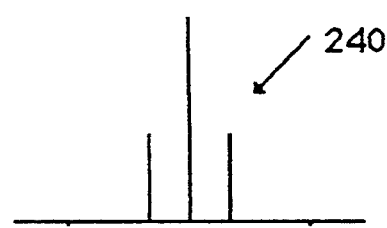
Figure 16F:
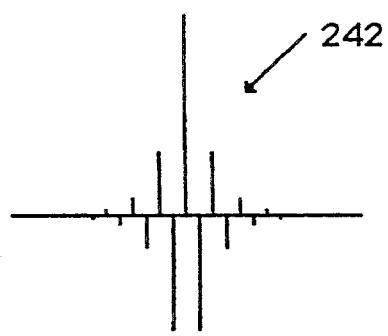

A number of options exist in constructing the new composing function 238 of FIG. 16D. As long as the zeros are moved off the unit circle an inverse can be found and the system shown in FIGS. 1A-B will operate. They need not be moved distance r and 1/r as described above. If each zero on the unit circle is replaced by a pair as described above then from filter theory it is known that the composing function 238 will be symmetric about the midpoint. In general the number of terms in the inverse 242 will decrease as $r$,241 decreases. The value of r used here was 0.70.

The spacing between embedded samples 240 is another parameter. In this case every third sample from the composing function 238 was chosen. This implies that in the system of FIGS. 1A-B a scaled composing function will be transmitted every third sample interval. Since the standard Digital Cellular system transmits a scaled composing function every eighth sample interval this implies an increased symbol rate of 8/3 and a corresponding increase in bit rate. If every second sample from composing function 238 is chosen as an embedded sample the bit rate will increase by 8/2. In this case the number of samples in the inverse 242 will increase, and more precision will be required in locating the embedded samples at the receiver.

Finally the starting composing function 236 can be altered. The samples making up the composing function can be interpolated and a new set chosen. The zeros of the Z tranform of this new set of samples can be determined to establish 237 and the process repeated. This approach can be useful in modifying the number of significant samples in the inverse filter 242.

Figure 17A:
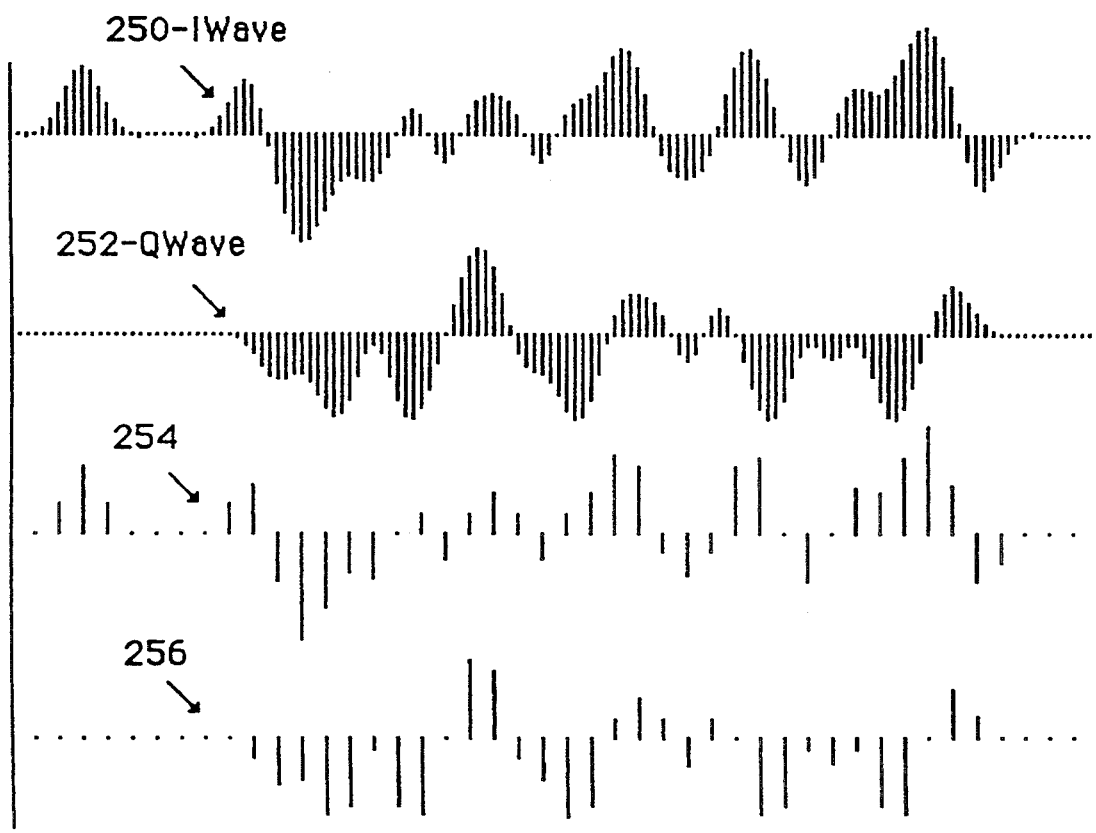
FIGS. 17A-B: Transmission and Reception of a Random Wave in a Passband System Using a Composing Function and an Inverse Filter.
Figure 17B:
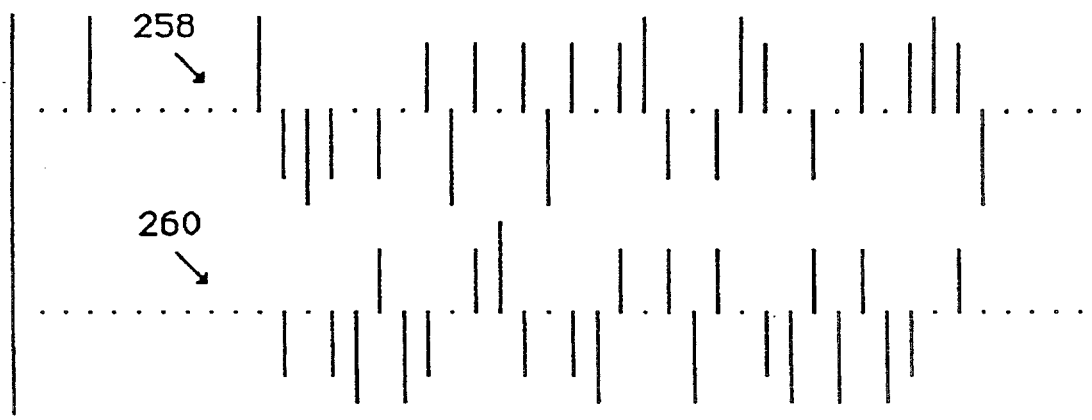

FIGS. 17A-B shows the typical waveforms present in one embodiment of the invention. The IWave 250 is generated by the system of FIGS. 1A-B when the composing function 238 of FIG. 16D is used as the composing function 14 of FIG. 1A. In this case scaled composing functions are transmitted every three sample intervals, therefore generating embedded samples separated by three sample intervals. QWave 252 is the corresponding Q wave. The modulating $I_k$ and $Q_k$ signals used in the information portion of the wave were generated by random bit generation followed by encoding using the previously described encoding/decoding table. The information portion of the wave was preceded by a prepulse. The values of $I_k$ and $Q_k$ used in this and subsequent examples are:

$$I_k \ldots 1.0,0.0,0.0,0.0,0.0,0.0,0.0,1.0,-0.707,-1.0,-0.707,0.0,-0.707, \\ 0.0,0.707,-1.0,0.707,0.0,0.707,-1.0 \tag{11}$$

$$Q_k \ldots 0.0,0.0,0.0,0.0,0.0,0.0,0.0,0.0,-0.707,0.0,-0.707,-1.0,0.707, \\ -1.0,-0.707,0.0,0.707,1.0,-0.707,0.0$$

IWave 250 and the QWave 252 are modulated and demodulated and arrive as input baseband waveforms 19 at the receiver shown in FIG. 1B. Assume the, embedded samples in the arriving I and Q baseband signals have been located. Embedded samples 254 arrive in the IWave and embedded samples 256 arrive in the QWave. These embedded samples are passed through the inverse filter 26 of FIG. 1B. The inverse filter used is 242 of FIG. 16F. The output samples 258 are the I channel output and the output samples 260 are the Q channel output. If the magnitude of the largest signal is taken as 1.0, then the magnitude of the smaller non zero sample is found to be of the order of 0.707. The received values of $I_k$ and $Q_k$ as shown in 258 and 260 respectively are found to correspond to the transmitted values shown in relationships (11).

In summary in this embodiment of the invention an increase in the bit rate of Standard Digital Cellular has been achieved by transmitting overlapping composing functions, the composing function having embedded samples. The inverse of these embedded samples is the inverse filter. Decoding is accomplished by locating the embedded samples in the received I and Q baseband signals and passing the embedded samples through the inverse filter.

It is clear the passband invention is not limited to the above embodiment. Consider for example using two baseband waves of the type previously discussed for baseband systems, one for I and one for Q. A system of this kind is an amplitude modulated system. If the composing function 238 of FIG. 16D is used and the system is limited to 4 levels, i.e. two bits/symbol, then this system will transmit the same number of bits/second as the modified Digital Cellular system which has been described. It is clear the invention is not restricted to a particular kind of modulation, ie DQPSK or amplitude modulation.

Baseband carrier equalization, predistortion equalization, embedded sample equalization, have a parallel in the :passband case, These equalization methods are very important for the transmission Of waves with embedded samples. In addition they can be applied to passband channels which do not use embedded sample transmission. For example they can be applied in a novel manner to the existing Digital Cellular system to significantly improve the performance. Accordingly, the following development is done without regard to the modulation method. The interaction of multiple waves arriving at the receiver is analyzed and novel methods proposed to remove the intersymbol interference introduced by the channel.

EQUALIZATION OF THE PASSBAND CHANNEL

The analysis below develops the following results for the fading passband channel:
- a method of removing the distortion on the I and Q baseband waves by filtering the I and Q waves arriving at the receiver. This result is illustrated in FIGS. 17A-B and FIGS. 18A-C. This is the baseband carrier equalizer 20 of FIG. 1B.
- a method of predistorting the I and Q waves at the transmitter so that the I and Q baseband waves arriving at the receiver are undistorted. This result is illustrated in FIGS. 20A-B and FIGS. 21A-C
- a method of removing the distortion introduced by the fading channel when the receiver is in motion. This result is illustrated in FIGS. 22A-C and FIG. 23.

These analytical results are achieved in the following steps. An analytical expression for the standard modulator shown in FIG. 12 is introduced. The process of up and down conversion is analyzed when one wave arrives at the receiver. This requires the introduction of known trigonometric expressions. Next two waves arriving at the receiver are considered. The distortion introduced can easily be analyzed using additional known trigonometic expressions. These results are extended to describe the real physical situation where multiple waves arrive. At this point in the analysis it is clear that the end to end baseband channel is a linear sytem which can be described by Z transforms. The channel description in Z transform form is manipulated to obtain the results outlined above.

The modulator shown in FIG. 12 is a standard method of generating I and Q waves. It has a complex representation and a representation which displays I and Q channels as real time functions. The description from Lee/Messerschmitt is $$x(t) = \sqrt{2} \, Re\{e^{j\omega_c t} \sum_{k=-\infty}^{\infty} a_k g(t - kT)\} \quad (12)$$

where $a_k$ is complex. The real part of the above is $$x(t) = \sqrt{2} \, \cos(\omega_c t) \sum_{k=-\infty}^{\infty} I_k g(t - kT) - \quad (15)$$
$$\sqrt{2} \, \sin(\omega_c t) \sum_{k=-\infty}^{\infty} Q_k g(t - kT)$$

$x(t)$ is the waveform generated by the system of FIG. 12. Consider the demodulation of this wave when arriving at the receiver. To demodulate the I channel multiply (13) by $\sqrt{2} \cos(\omega_c t)$ and use the relation $$2\cos^2(\omega_c t) = 1 + \cos(2\omega_c t)$$

Filter out the term $\cos(2\omega_c t)$ using a low pass filter, then from the first product term in (13) above obtain $$\sum_{k=-\infty}^{\infty} I_k g(t - kT)$$

which is the original modulation. Multiplication of the second term in (13) by $\sqrt{2} \cos(\omega_c t)$ gives a term of the form $\cos(\omega_c t) \sin(\omega_c t)$, and since $$2\sin(\omega_c t)\cos(\omega_c t) = \sin(2\omega_c t)$$

this product term will be removed by the low pass filter. To recover the Q channel multiply equation (13) by $\sqrt{2} \sin(\omega_c t)$. Use the relation $$2\sin^2(\omega_c t) = 1 - \cos(2\omega_c t)$$

Filter with a low pass filter to obtain from the second term $$\sum_{k=-\infty}^{\infty} Q_k g(t - kT)$$

Multiplication of the first term in (13) by $\sqrt{2} \sin(\omega_c t)$ generates a double frequency term which is removed by filtering. It is clear from the above that terms involving $\sin^2(\omega_c t)$ or $\cos^2(\omega_c t)$ contribute to the demodulated wave, whereas terms of the form $\cos(\omega_c t) \sin(\omega_c t)$ are filtered out. This is used throughout the following analysis. Consider the interaction of a primary wave given by (13) above and a secondary wave delayed by $\Delta t$. The delayed wave will have the same form as (13) above with t replaced by $t + \Delta t$. Let the primary wave have amplitude $b_0$ and the delayed wave have amplitude $b_1$ then the $\cos(\omega_c t)$ terms of the sum wave is given by $$\sqrt{2} \, b_0 \cos(\omega_c t) \sum_{k=-\infty}^{\infty} I_k g(t - kT) + \quad (14)$$
$$\sqrt{2} \, b_1 \cos(\omega_c t + \omega_c \Delta \tau) \sum_{k=-\infty}^{\infty} I_k g(t + \Delta\tau - kT)$$

Since, $$\cos(\omega_c t + \omega_c \Delta\tau) = \cos \omega_c t \cos \omega_c \Delta\tau - \sin \omega_c t \sin \omega_c \Delta\tau$$

expression (14) can be written $$\sqrt{2} \, \cos(\omega_c t) \Big\{ \sum_{k=-\infty}^{\infty} b_0 I_k g(t - kT) + \quad (15)$$
$$b_1 \cos(\omega_c \Delta\tau) \sum_{k=-\infty}^{\infty} I_k g(t + \Delta\tau - kT) \Big\} -$$
$$\sqrt{2} \, \sin(\omega_c t) b_1 \sin(\omega_c \Delta\tau) \sum_{k=-\infty}^{\infty} I_k g(t + \Delta\tau - kT)$$

Similarly the sum of the $\sin(\omega_c t)$ terms of the primary and delayed waves can be written $$-\sqrt{2} \, b_0 \sin(\omega_c t) \sum_{k=-\infty}^{\infty} Q_k g(t - kT) - \quad (16)$$
$$\sqrt{2} \, b_1 \sin(\omega_c t + \omega_c \Delta\tau) \sum_{k=-\infty}^{\infty} Q_k g(t + \Delta\tau - kT)$$

Since, $$\sin(\omega_c t + \omega_c \Delta\tau) = \sin \omega_c t \cos \omega_c \Delta\tau + \cos \omega_c t \sin \omega_c \Delta\tau$$

expression (16) above can be written $$-\sqrt{2} \, \sin(\omega_c t) \Big\{ \sum_{k=-\infty}^{\infty} b_0 Q_k g(t - kT) + \quad (17)$$
$$b_1 \cos(\omega_c \Delta\tau) \sum_{k=-\infty}^{\infty} Q_k g(t + \Delta\tau - kT) \Big\} -$$
$$\sqrt{2} \, \cos(\omega_c t) b_1 \sin(\omega_c \Delta\tau) \sum_{k=-\infty}^{\infty} Q_k g(t + \Delta\tau - kT)$$

To recover the I channel multiply (15) and (17) by $\sqrt{2} \cos(\omega_c t)$ and filter to obtain $$\sum_{k=-\infty}^{\infty} b_0 I_k g(t - kT) + \quad (18)$$
$$b_1 \cos(\omega_c \Delta\tau) \sum_{k=-\infty}^{\infty} I_k g(t + \Delta\tau - kT) -$$
$$b_1 \sin(\omega_c \Delta\tau) \sum_{k=-\infty}^{\infty} Q_k g(t + \Delta\tau - kT)$$

To recover the Q channel multiply (15) and (17) by $\sqrt{2} \sin(\omega_c t)$ and filter to obtain $$-\sum_{k=-\infty}^{\infty} b_0 Q_k g(t - kT) - \quad (19)$$
$$b_1 \cos(\omega_c \Delta\tau) \sum_{k=-\infty}^{\infty} Q_k g(t + \Delta\tau - kT) -$$
$$b_1 \sin(\omega_c \Delta\tau) \sum_{k=-\infty}^{\infty} I_k g(t + \Delta\tau - kT)$$

Consider the recovered baseband signal in the I channel given by (18) above. The first term is the undistorted primary wave with scale factor $b_0$. The second term is a copy of the primary wave delayed by $\Delta t$ and scaled by $b_1 \cos(\omega_c \Delta t)$. The third term is a cross modulation term whose value depends on the modulation or the Q channel as well at the scale factor $b_1 \sin(\omega_c \Delta t)$. The terms $\sin(\omega_c \Delta t)$ and $\cos(\omega_c \Delta t)$ can be evaluated at a particular point in space if the carrier frequency is known and the differential delay between the primary wave and delayed wave is known. If the receiver moves to a point where $\Delta t$ takes on a new value then these scale factors change. At a fixed point in space the baseband channel associated with the I signal can be represented by a linear system with two inputs, the I baseband wave and the Q baseband wave, designated IWave and QWave respectively. This system scales the IWave by $b_0$, and also scales it by $b_1 \cos(\omega_c \Delta t)$, and the QWave is scaled by $b_1 \sin(\omega_c \Delta t)$. The output of this linear system is the sum of the three terms and is designated IFade.

Since the IWave and QWave are themselves the sum of scaled values of $G(z)$ it follows from the superposition property of linear systems that the baseband wave received at the receiver will be equalized by the same filter which removes the distortion in $G(z)$. It is also clear that if we move to a different point in space so the scaling factors change, the linear system will change and the equalization required will change.

This two ray model with a primary and delayed wave will be used in the examples which follow as it has been found to demonstrate all the features which are present in the multiple ray model whose development follows.

Consider a multiplicity of waves arriving and choose one as a reference. Suppose it arrives at the receiver with amplitude $b_0$. If there are m arriving waves in addition to the reference wave, expression (15) can be modified to give the $\cos(\Delta_c t)$ terms of the sum wave;

$$\sqrt{2}\cos(\omega_c t)\left\{ \sum_{k=-\infty}^{\infty} I_k b_0 g(t - kT) + \sum_{n=1}^{m} \sum_{k=-\infty}^{\infty} b_n \cos(\omega_c \Delta_n \tau) I_k g(t + \Delta_n \tau - kT) \right\} - \qquad (20)$$

$$\sqrt{2}\sin(\omega_c t)\left\{ \sum_{n=1}^{m} \sum_{k=-\infty}^{\infty} b_n \sin(\omega_c \Delta_n \tau) I_k g(t + \Delta_n \tau - kT) \right\}$$

Similarily expression (17) can be modified to give the sum of the $\sin(\omega_c t)$ terms of the sum wave $$-\sqrt{2}\sin(\omega_c t)\left\{ \sum_{k=-\infty}^{\infty} Q_k b_0 g(t - kT) - \sum_{n=1}^{m} \sum_{k=-\infty}^{\infty} b_n \cos(\omega_c \Delta_n \tau) Q_k g(t + \Delta_n \tau - kT) \right\} - \qquad (21)$$

$$\sqrt{2}\cos(\omega_c t)\left\{ \sum_{n=1}^{m} \sum_{k=-\infty}^{\infty} b_n \sin(\omega_c \Delta_n \tau) Q_k g(t + \Delta_n \tau - kT) \right\}$$

To recover the I channel multiply (20) and (21) above by $\sqrt{2}\cos(\omega_c t)$ and filter to obtain $$\sum_{k=-\infty}^{\infty} I_k b_0 g(t - kT) + \qquad (22)$$

$$\sum_{n=1}^{m} \sum_{k=-\infty}^{\infty} b_n \cos(\omega_c \Delta_n \tau) I_k g(t + \Delta_n \tau - kT) -$$

-continued $$- \sum_{n=1}^{m} \sum_{k=-\infty}^{\infty} b_n \sin(\omega_c \Delta_n \tau) Q_k g(t + \Delta_n \tau - kT)$$

To recover the Q channel multiply (20) and (21) above by $\sqrt{2}\sin(\omega_c t)$ and filter to obtain $$- \sum_{k=-\infty}^{\infty} Q_k b_0 g(t - kT) - \qquad (23)$$

$$\sum_{n=1}^{m} \sum_{k=-\infty}^{\infty} b_n \cos(\omega_c \Delta_n \tau) Q_k g(t + \Delta_n \tau - kT) -$$

$$- \sum_{n=1}^{m} \sum_{k=-\infty}^{\infty} b_n \sin(\omega_c \Delta_n \tau) I_k g(t + \Delta_n \tau - kT)$$

Consider transmitting a unit pulse on the I channel ($I_0 = 1$) and a zero pulse on the Q channel ($Q_0 = 0$). This involves sending a signal $I_0 G(z)$ on the I channel and zero signal on the Q channel. Consider sampling the I channel and the Q channel. Represent the sampled version of the first term in (22) above by $b_0 G(z)$ and the second term by $E(z)$, and the third term by $C(z)$. If the sampled I channel response is given by $R(z)$, then it follows from (22), $$b_0 G(z) + E(z) = R(z)$$

It also follows from expression (23) that the response on the Q channel is $C(z)$.

Next transmit an arbitrary amplitude $I_0$ on the I channel and an arbitrary amplitude $Q_0$ on the Q channel. Represent the I channel response by $I(z)$ and the Q channel response by $Q(z)$ then the following equations apply:

$$I_0 b_0 G(z) + I_0(R(z) - b_0 G(z)) + Q_0 C(z) = I(z)$$

$$-Q_0 b_0 G(z) - Q_0(R(z) - b_0 G(z)) + I_0 C(z) = Q(z) \qquad (24)$$

Solving the second in (24) for $Q_0$ and substituting into the first gives $$I_0 = (R(z)I(z) + C(z)Q(z))/(R^2(z) + C^2(z)) \qquad (25)$$

Equation (25) describes how to obtain $I_0$ given the I and Q channel responses.

An equalized channel would have the response $I_0 G(z)$ to an tranmitted pulse $I_0$. It follows that the equalizer required to equalize the I channel is $$I_0 G(z) = \{G(z)R(z)/(R^2(z) + C^2(z))\}I(z) + \{G(z)C(z)/(R^2(z) + C^2(z))\}Q(z) \qquad (26)$$

In (26) the coefficients of $I(z)$ and $Q(z)$ are determined by exciting the system with a unit pulse on the I channel and zero on the Q channel and recording the response on the I channel as $R(z)$ and recording the response on the Q channel as $C(z)$, followed by the operations indicated above.

Similiarly the Q channel can be equalized by $$Q_0 G(z) = \{G(z)C(z)/(R^2(z) + C^2(z))\}I(z) - \{G(z)R(z)/(R^2(z) + C^2(z))\}Q(z) \qquad (27)$$

Equations (26) and (27) can be written $$I_0 G(z) = F_1(z)I(z) + F_2(z)Q(z) \qquad (28)$$

$$Q_0 G(z) = F_2(z)I(z) + F_1(z)Q(z) \tag{29}$$

where:

$$F_1(z) = G(z)R(z)/(R^2(z) + C^2(z))$$

$$F_2(z) = G(z)C(z)/(R^2(z) + C^2(z)) \tag{30}$$

Equations (28) and (29) show how tranmitted pulses $I_0 G(z)$ and $Q_0 G(z)$ can be recovered from the response $I(z)$ on the I channel and $Q(z)$ on the Q channel. It follows from the superposition property of linear systems, since the transmitted baseband I and Q channels are scaled versions of $G(z)$, that the received waves will be equalized by using the filtering operations specified in equations(28) and (29). Designate the transmitted baseband wave in the I channel by IWave and the transmitted baseband wave in the Q channel by QWave. Designate the received baseband I channel wave by IFade and the Q channel received wave by QFade. It follows that if $I(z)$ and $Q(z)$ in equation(28) are IFade and QFade then the output will be IWave. Similiarly if $I(z)$ and $Q(z)$ in equation(29) are IFade and QFade then the output will be QWave.

Figure 18A:
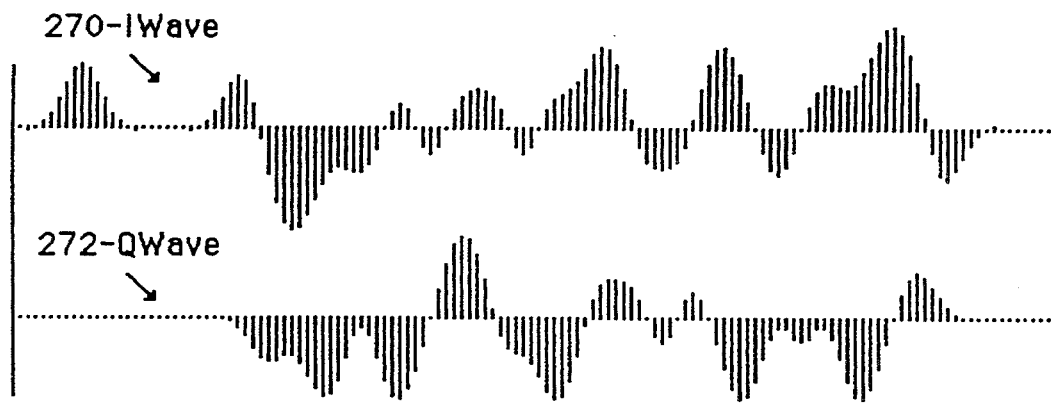
FIGS. 18A-C: Baseband Carrier Equalization for a Passband Channel.
Figure 18B:
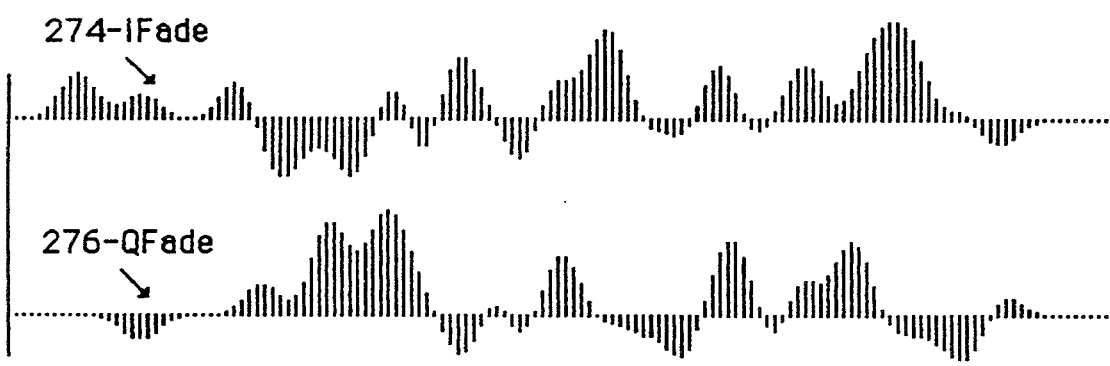
Figure 18C:
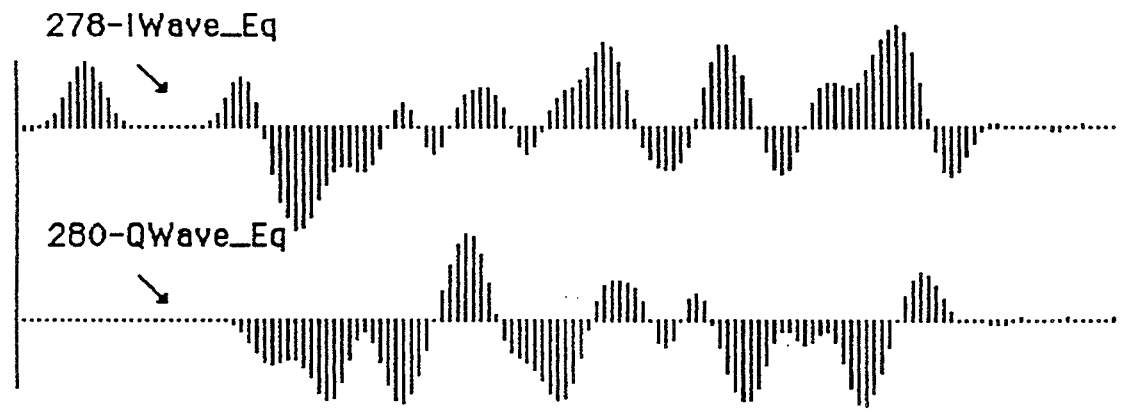
Figure 19A:
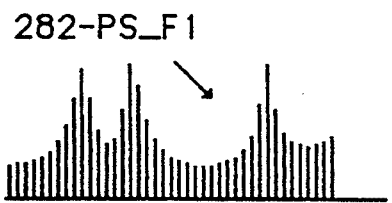
FIGS. 19A-D: Random Wave Power Spectral Estimates Required in Truncating the Equalizing Filters Used at the Receiver.
Figure 19B:
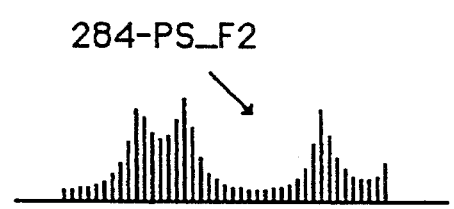
Figure 19C:
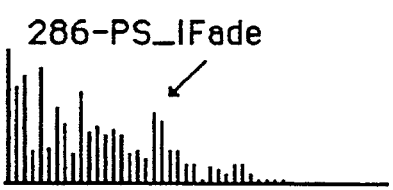
Figure 19D:
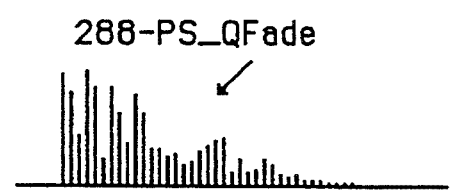

FIGS. 18A-C illustrates equalization of IFade and QFade. First the waveforms labelled IWave,270 and QWave,272 were generated using the system of FIG. 1A. The composing function, 238 of FIG. 16D was used as composing function 14 in FIG. 1A. The $I_k$ and $Q_k$ values were those in expression(11). The waves 270 and 272 are then the same as the waves 250 and 252 of FIG. 17A.

The waves IFade,274 and QFade,276 were then generated using the two ray model. Equation (18) was used to generate IFade and equation (19) was used to generate QFade. The primary wave was taken to have amplitude 1.0. The delayed wave had amplitude 0.75 with a delay of 40 microseconds corresponding to the maximum delay specified in IS-54. Since the symbol rate is 24.3 kilosymbols per second, the symbol time is of the order of 41 microseconds, so the delay is of the order of one symbol time. The carrier phase shift shown in equation (18) as $\omega_c \Delta t$ was taken as $\pi/4$ radians.

Generation of IWave_Eq,278 and QWave_Eq,280 requires manipulation of equations (30). Consider the denominator. This involves convolving the sample sequence $R(z)$ with itself by multiplication of Z transforms and adding to the convolution of the sequence $C(z)$ with itself. The same sample sequence will be obtained if we take the DFT, equation (1), of the sequence represented by $R(z)$ multiply it by itself, add it to the DFT of $C(z)$, multiplied by itself, followed by the IDFT. It turns out to be convenient to stay in the frequency domain in order to perform inversion.

Consider finding the DFT of $F_1(z)$ as given in equation (30). The prepulse at the start of the IFade,274 in FIG. 18B is $R(z)$ and the prepulse at the start of the QFade,276 is $C(z)$.

Consider the DFT of the denominator. This involves finding the DFT of the sample sequence represented by $R(z)$, squaring it and adding to the square of the DFT of $C(z)$. At this point the number of frequency terms to be taken in the denominator is not clear. Taking a number of terms equal to the number of significant frequency terms in the numerator is a good first estimate. In this example 40 frequency terms were taken. Next invert the denominator by multiplication of each term by its complex conjugate. The DFT of the samples in $F_1(z)$, hereafter called F1, is then found by multiplication of the inverted frequency function by the DFT of $G(z)$ and the DFT of $R(z)$ as indicated in the first of equations (30). F2 can be calculated in the same manner.

To find the DFT of the equalized IWave it follows from equation (28) that multiplication of the DFT's of IFade,QFade,F1,F2 are required. Designate the power spectrum of F1 by PS_F1. The power spectrum of F1 ,F2,IFade,QFade are shown in FIGS. 19A-D as 282,284,286,288 respectively. It is clear that in performing the transform multiplications required the DFT of IFade and QFade will act to truncate the DFT of F1 and F2. The IDFT of the DFT from equation (28) is shown in FIG. 18C as IWave_Eq,278. Similiarly the wave output from equation (29) is shown as QWave_Eq. Comparison of the equalized waves 278 and 280 with the transmitted waves 270 and 272 shows neglible distortion.

In summary, equalization at the receiver requires sending prepulses to provide information about $R(z)$ and $C(z)$. Frequency domain filters F1 and F2 can then be calculated from equations (30). The I and Q transmitted waves can then be recovered from the I and Q received waves by filtering according to equations (28) and (29).

In the example shown here IFade and QFade were short signals. If IFade and QFade are long signals to be equalized then they may be segmented as described in the Overlap-Save method in Rabiner and Gold and F1 and F2 applied as described. The frequency spectrum of a typical segment should be determined to establish the number of freqeuncy terms required in F1 and F2.

Consider predistorting the transmitted signals so that the transmission medium acts as an equalizer and the signals arrive at the receiver undistorted. The response to signals $I_0 G(z)$, $Q_0 G(z)$ is given by (24):

$$I_0 R(z) + Q_0 C(z) = I(z)$$

$$Q_0 R(z) + I_0 C(z) = Q(z) \tag{31}$$

It is convenient to view $I_0$ and $Q_0$ as impulses exciting $G(z)$. Conside inserting an additional filter ahead of $G(z)$ in the I channel and similiarly in the Q channel. Let these filters be represented by $I_{in}(z)$ and $Q_{in}(z)$. Consider seeking a value for these filters such that the signals arriving in the I and Q channel are undistorted. The following equations then apply:

$$\begin{aligned} I_0 I_{in}(z) R(z) + Q_0 Q_{in}(z) C(z) &= I_0 G(z) \\ - Q_0 Q_{in}(z) R(z) + I_0 I_{in}(z) C(z) &= Q_0 G(z) \end{aligned} \tag{32}$$

Solving the above for $I_0 I_{in}(z)$ and $Q_0 Q_{in}(z)$ gives $$I_0 I_{in}(z) = (R(z)G(z)I(R^2(z) + C^2(z)))I_0 + \tag{33}$$

$$(C(z)G(z)I(R^2(z) + C^2(z)))Q_0$$

$$Q_0 Q_{in}(z) = (C(z)G(z)I(R^2(z) + C^2(z)))I_0 -$$

$$(R(z)G(z)I(R^2(z) + C^2(z)))Q_0$$

Identifying $F_1(z)$ and $F_2(z)$ the above can be written $$\begin{aligned} I_0 I_{in}(z) &= F_1(z)I_0 + F_2(z)Q_0 \\ Q_0 Q_{in}(z) &= F_2(z)I_0 - F_1(z)Q_0 \end{aligned} \tag{34}$$

The above equations (34) give the output of the filters preceding G(z). The signals to send in the I and Q channels are then $$P_1(z)I_0 + P_2(z)Q_0 \tag{35}$$

$$P_2(z)I_0 - P_1(z)Q_0 \tag{36}$$

where $$P_1(z) = F_1(z)G(z)$$

$$P_2(z) = F_2(z)G(z) \tag{37}$$

Figure 20A:
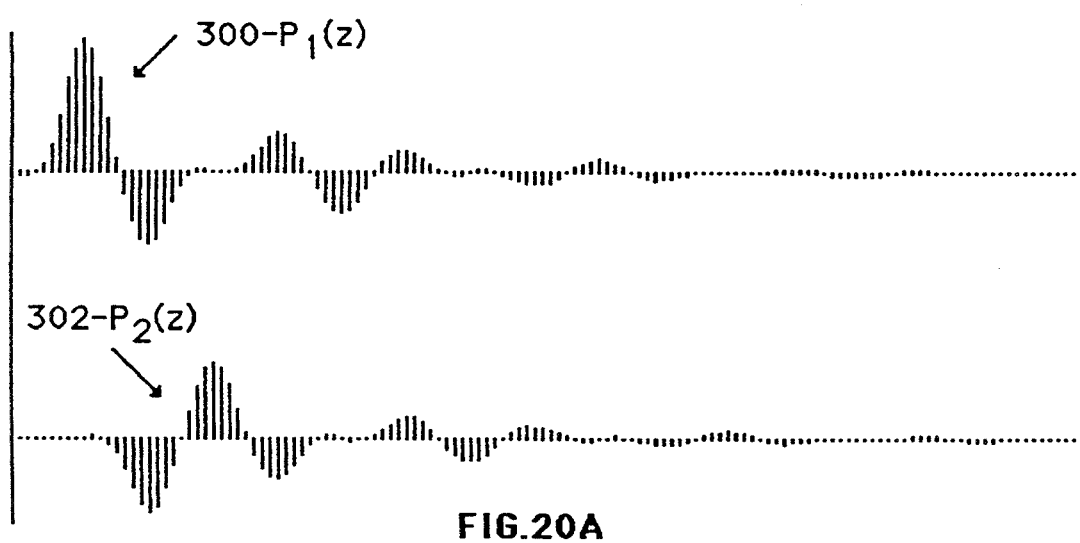
FIGS. 20A-B: Dual Predistortion Composing Functions Used at the Transmitter. Receiver Response to the Predistortion Composing Functions.
Figure 20B:

The DFT of $F_1(z)$ and $F_2(z)$ are available, therefore the DFT of $P_1(z)$ and $P_2(z)$ can be determined by multiplication by the DFT of G(z). The IDFT can then be applied to find $P_1(z)$ and $P_2(z)$. $P_1(z)$,300 and $P_2(z)$,302 are shown in FIG. 20A.

As in the baseband case the equalization can be split between the transmitter and receiver. Some reflection shows that if the DFT of $F_1(z)$ and $F_2(z)$ are split into the product of two DFT, in the manner described for baseband systems, then the equalization will be split between predistortion at the transmitter and filtering at the receiver.

It follows from equations (35) and (36) that if $I_0=1$ and $Q_0=0$, then sending $P_1(z)$ in the I channel and $P_2(z)$ in the Q channel, the received signals after transmission over the fading channel should be G(z) and 0. The signals which arrive are shown as IArriv,304 and QArrive,306 in FIG. 20B and indeed are as expected.

Figure 21A:
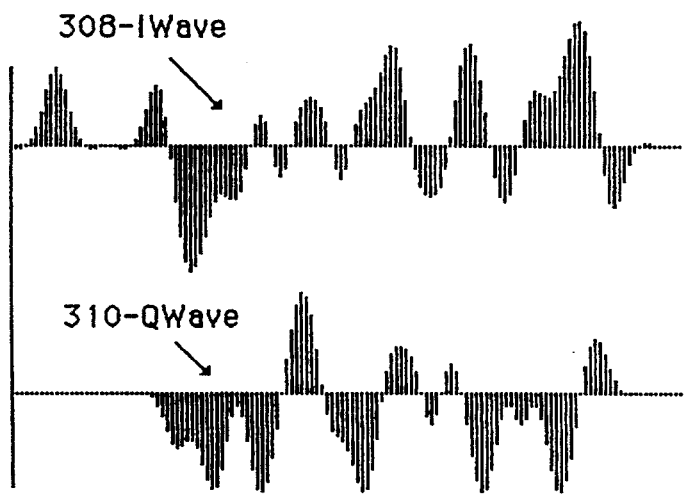
FIGS. 21A-C: Dual Composing Function Predistortion Equalization for the Passband Channel.
Figure 21B:
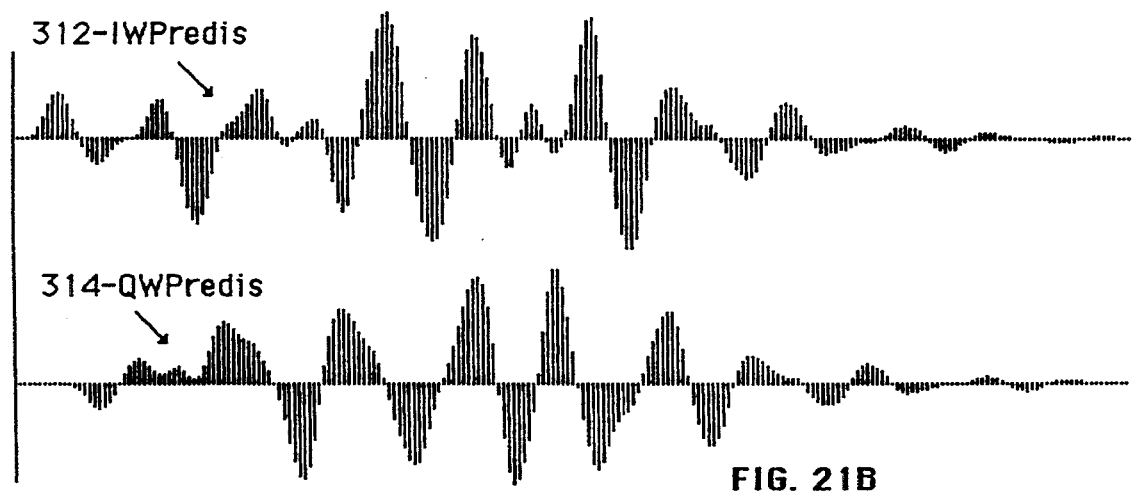
Figure 21C:
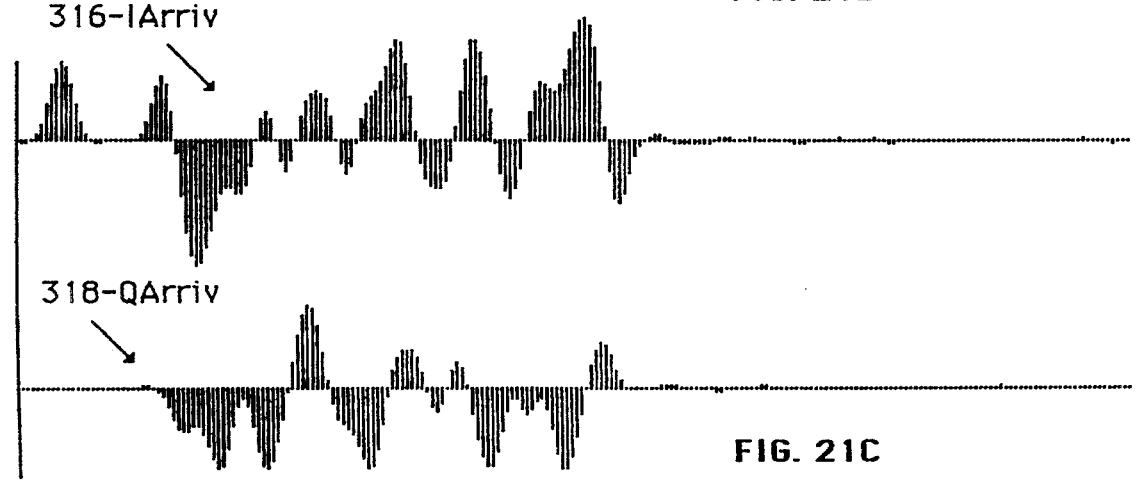
Figure 24A:
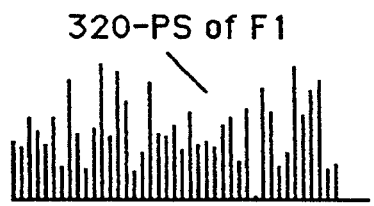
FIGS. 24A-D: Power Spectral Estimates Required to Estimate Denominator Truncation.
Figure 24B:
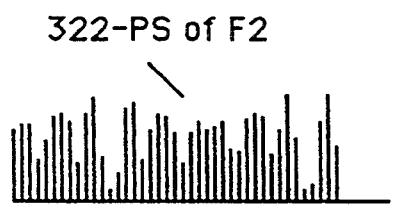
Figure 24C:
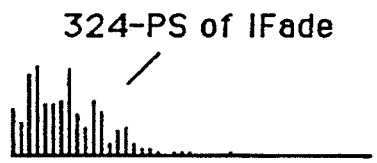
Figure 24D:
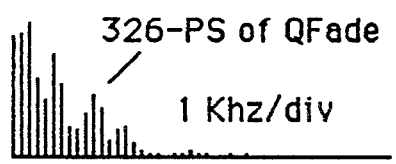

It further follows from equations (35) and (36) that if the information to be transmitted is encoded using $P_1(z)$ and $P_2(z)$ as composing functions then the I and Q channels should arrive at the receiver undistorted. P1(z) and P2(z) of FIG. 20A were used as composing functions. Expression (35) was used to generate the I channel signal and expression (36) was used to generate the Q channel signal, where the modulation was as described in expression (11). FIGS. 21A–C shows these signals.

Undistorted signals IWave 308 and QWave 310 are shown for reference in FIG. 21A. The predistorted signals are shown as IWPredis 312 and QWPredis 314 in FIG. 21B. The signals which arrive after passing through the fading channel model are shown as IArriv 316 and QArriv 318 in FIG. 21C. Comparison of the arriving signals with the reference signals 308 and 310 shows negligible distortion as expected.

In existing Digital Cellular systems vehicle motion can cause the channel response to change significantly between the beginning and end of a packet. Consider the application of the receiver equalization method described herein to this environment. At a fixed point in space R(z) and C(z) are fixed, they can be measured and the receiver equalizer can be determined. At a different point in space these parameters will be different and a new equalizer will be required. The change in R(z) and C(z) can be estimated from equation (18) and (19). Previously in this model the primary wave was taken to have a value of 1.0, the delayed wave an amplitude of 0.75 and the delay of the secondary wave was taken as 40 microseconds corresponding to the maximum delay specified in IS-54. The carrier phase shift $\omega_c\Delta t$ was taken as /4. With motion the carrier phase shift can cause a significant change in R(z) and C(z). Consider the change in the parameter $\omega_c\Delta t$ from the start of the reception of a packet to the end of the packet, maintaining the same values for the other parameters.

The symbol rate in Digital Cellular is 24.3 kilosymbols/sec and there are 162 symbols in a packet. During the arrival time of a packet a car travelling at 120 km/hr will move about 0.22 meters, which takes the EM wave moving at the speed of light about 0.733 ms to traverse. If it is assumed that the car is moving directly up the primary wave and at right angles to the secondary wave, then the multipath change in delay during the reception of a packet is 0.733 ms. At a digital cellular frequency of 825 Mhz, the change in $\omega_c\Delta t$ is approximately 1.20 . The initial value of $\omega_c\Delta t$ used previously was 0.25 . Using the same initial value it follows that the values of $\omega_c\Delta t$ at the beginning, middle, and end of the packet are 0.25 , 0.85 , 1.45 . The test pattern, $I_0=1$; $Q_0=0$, used to measusre R(z) and C(z) was sent through the fading channel model for these three values of $\omega_c\Delta t$. The composing function for Digital Cellular 238 of FIG. 16D was used.

FIGS. 22A–C shows the results. Since this response determines the equalizer required, it is clear from the nature of the change in R(z) 310 and C(z) 312 that the equalizer required at the beginning, middle, and end of the packet will be different. It should be noted that a worst case has been considered, ie a differential delay of 40 microseconds was used as a beginning point, which is at the extremity of the specification, and it was assumed the vehicle moved directly up the primary wave.

Equalization can be performed by breaking the packet up into smaller packets and sending a prepulse at the head of each of these smaller packets and using the prepulse to equalize the following symbols. Alternatively, the information in the packet can be used to estimate R(z) and C(z). In this case a prepulse at the beginning of tire packet is used to find the equalizer, the first part of the packet is passed through the equalizer and the encoded information is recovered. The process is continued until the wave distortion is such that a new equalizer is required. The problem is then to find from the received wave, given the recovered data and the symbol position, the effective values of R(z) and C(z). This development follows.

Consider signals $I_0$ and $Q_0$ to be applied followed by $I_1$ and $Q_1$ and preceded by $I_{-1}$ and $Q_{-1}$ separated by 8 time units. The I channel response to each of the I,Q pairs is given by the first of equations (24) and can be written:

$$\begin{aligned} I_{-1}z^{-8}R(z) + Q_{-1}z^{-8}C(z) &= I_{-1}(z) \\ I_0R(z) + Q_0C(z) &= I_0(z) \\ I_1z^{+8}R(z) + Q_1z^{+8}C(z) &= I_1(z) \end{aligned} \tag{38}$$

Assume a packet of limited time duration with m symbols preceding $I_0$ and n symbols following $I_0$, in which case there are n+m+1 equations of the above form. Recognize that the sum of the right sides of the above format is the total I channel response I(z). Adding the n+m+1 equations of the above form for the I channel and a similiar set of equations for the Q channel where Q(z) is the response of the Q channel then, $$F_1(z)R(z) + F_2(z)C(z) = I(z)$$

$$-F_2(z)R(z) + F_1(z)C(z) = Q(z) \tag{39}$$

where $$F_1(z) = (I_{-m}z^{-8m} + \ldots + I_{+n}z^{+8n})$$

$$F_2(z) = (Q_{-m}z^{-8m} + \ldots + Q_{+n}z^{+8n}) \tag{40}$$

Solving (39) for R(z) and C(z) gives $$R(z) = (I(z)F_1(z) - Q(z)F_2(z))/(F_1^2(z) + F_2^2(z))$$

$$C(z) = (Q(z)F_2(z) + I(z)F_1(z))/(F_1^2(z) + F_2^2(z)) \tag{41}$$

Application of (41) is shown in FIGS. 23,24A–D and 25A–B. Symbols are transmitted separated by 8 sample intervals. The start of the first symbol is shown as 314 in FIG. 23. The encoded information was:

$$\begin{aligned}
I_k \ldots\ & 1.0, 0.0, 0.0, 0.0, 0.0, 0.0, 0.0, 0.0, 1.0, -0.707, -1.0, -0.707, \\
& 0.0, \\
& -0.707, 0.0, 0.707, -1.0, 0.707, 0.0, 0.707, -1.0 \\
Q_k \ldots\ & 0.0, 0.0, 0.0, 0.0, 0.0, 0.0, 0.0, 0.0, 0.0, -0.707, 0.0, -0.707, \\
& -1.0, 0.707, -1.0, -0.707, 0.0, 0.707, 1.0, -0.707\text{-} \\
& , 0.0
\end{aligned} \tag{42}$$

The signals IFade 317 and QFade 319 of FIG. 23 were generated with the above data using the baseband modulator 16 of FIG. 1A with the Digital Cellular composing function 238 of FIG. 16D, followed by passage through the fading channel model. The steps implied in equation (41) were then applied to these waves to recover R(z) and C(z).

The DFT was used to evaluate F1(z) and F2(z) defined in equation (40) and used in equation (41), using the input data in expression (42). The number of terms required in this evaluation is apparent from FIGS. 24A–D. The power spectrum of F1,F2,IFade,QFade, are shown as 320,322,324,326 respectively. It is apparent when terms of the form I(z)F(z),Q(z)F(z), which appear in the numerator of equations (41), are formed the DFT will be truncated, and these terms can be evaluated.

Figure 25A:
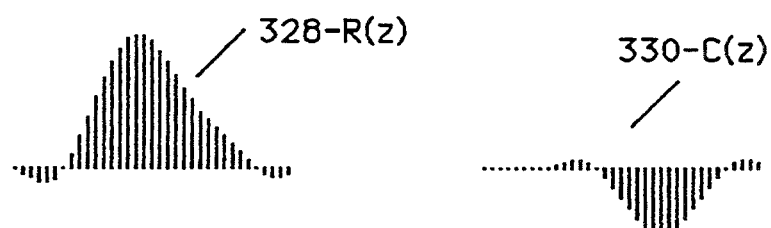
FIGS. 25A-B: Recovered Distorted Composing Functions.

The recovered R(z) 328 and C(z) 330 are shown in FIG. 25A. These are to be compared with R(z) 332 and C(z) 334 which are the prepulses shown in FIG. 23.

Figure 25B:
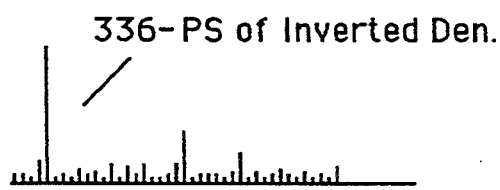

In this analysis the denominator in equations (41), in some cases, had terms in the frequency domain which were very small making inversion difficult. FIG. 25B shows the power spectrum of the denominator of equations (41) after inversion as 336. The difference between the smallest and largest amplitude provides a measure of how close the inversion process is to being unmanageable. As the number of symbols increases the difference between the largest and smallest amplitude decreases.

In summary, when the receiver is moving fast enough to cause the impulse response to change significantly during the reception of a packet equalization can be accomplished by breaking the packet into smaller packets and preceding each with a prepulse so that R(z) and C(z) can be determined. Alternatively R(z) and C(z) can be extracted from the the first segment of the received wave, using the recovered modulation, and these values of R(z) and C(z) used to equalize the next wave segement, and so forth. In either case R(z) and C(z) are used to establish a Baseband Equalizer for Passband Systems as described in connection with FIGS. 18A–C.

The invention shown in FIGS. 1A–B Can be summarized as follows. The composing functions can be those associated with a conventional modulation system in which case the modulator will generate waveshapes normally associated with that system. The composing functions can be modified to generate distorted waveshapes so that after transmission through a channel the waveshapes arriving at the receiver are undistorted. The composing functions required are established in a deterministic manner from channel measurements. This type of equalization has been termed full predistortion equalization. Alternatively a portion or all the channel equalization can be done at the receiver. Any residual distortion in the signals arriving at the receiver can be removed by finding the filtering required to map distorted composing functions into undistorted composing functions and applying the same filtering to the received distorted signals. The distorted composing functions used to calculate the equalization required can be isolated by transmitting undistorted composing functions through the channel and measuring the response or by extracting the distorted composing functions from the received distorted waves as described in connection with FIGS. 25A–B. In systems where the channel response varies during the reception of a packet the extraction process can be used to extract distorted composing functions from segments of the received distorted waves. These distorted composing functions can be used to determine the equalization required to remove any distortion in the received segments. Successive wave segments can be equalized in a similiar manner. The equalization method while operating can be configured from full predistortion equalization to partial predistortion equalization to full receiver equalization. Continuous and rapid updating of the transmitter composing functions can be done to maintain approximately full predistortion equalization. This will remove any fading as seen by the receiver as the receiver moves relative to the transmitter.

If the undistorted composing functions are modified to contain a set of embedded samples, as described in connection with FIGS. 2A–F and FIGS. 16A–F, and these modified composing functions are transmitted in overlapping symbol times then increased bit rates can be realized over conventional modulation systems. The demodulator locates the embedded samples in the equalized waves and passes the embedded samples through an inverse finite impulse response filter to recover the applied modulation. An embedded sample equalizer, as described in connection with FIGS. 3A–C, can be used to remove residual distortion in the embedded samples output from the inverse filter. Full predistortion equalization, partial predistortion equalization or full receiver equalization can be used on the waves generated using composing functions which contain embedded samples.

The equalization methods described herein for baseband and passband systems are analogous but for the most part have different implementations. By contrast the methods used to locate the embedded samples in the received waves tend to be the same in both baseband and passband systems. Embedded sample location by eye pattern adjustment and embedded sample location by offset determination as previously described, will be referenced in the claims and applied to baseband and passband systems.

Many passband systems use the modulator shown in FIG. 12 with frequency domain filtering to generate the output waveforms, however there is no identifiable g(t), as shown in FIG. 12. g(t) can be determined by finding the inverse fourier transform of the frequency domain filter as described in connection with FIG. 14. The I and Q signals generated by adding scaled values of g(t) will be the same as those generated by using frequency domain filtering. The I and Q output signals from a system using frequency domain filtering may then be viewed as the sum of scaled composing functions although a composing function may not be explicitly in evidence when frequency domain filtering is used. Therefore frequency domain filtering is regarded as one of several practical means of generating sample streams which are the sum of scaled values of composing functions.

The system of FIG. 12 is used in practice to generate many of the standard digital signals. The generation of DQPSK (differential quadrature phase shift keying) has been described. QAM (quadrature amplitude modulation) is very easily generated by separately controlling the amplitude of the I and Q channels. Simple PSK (phase shift keying) is easily generated. The system of FIG. 12 can be described in general terms as the generation of sample streams which are the sum of scaled composing functions. It follows that equalization techniques which act to recover waves which are the sum of scaled values of composing functions can be used to equalize any of the modulated signals which can be generated by the system of FIG. 12 i.e. DQPSK,QAM,PSK. In particular the baseband equalizer for passband systems described in equations 28,29,30 and FIGS. 18A-C can be used to provide equalization at the receiver for any of these systems. Predistortion equalization can be provided for these systems using the composing functions described in equations (37) and FIGS. 20A-B. Accordingly modulation will be described as the generation of one or more sample streams comprised of the sum of scaled values of composings functions. Transmission of these streams through one or more channels which act as a linear system will cause the output streams to be the sum of scaled values of distorted composing functions. Equalization involves mapping these output streams into streams which are the sum of scaled values of undistorted composing functions. If the undistorted composing function contains embedded samples then demodulation involves locating the embedded samples and passing them through the inverse filter. Embedded sample equalization is performed by passing the embedded samples associated with a prepulse through the inverse filter and determining the nature of the pulses surrounding the main pulse, then using the method described in connection with FIGS. 3A-C to establish the filter which will remove these side pulses. This filter can be convolved with the old inverse filter to establish a modified inverse filter.

At the receiver the time between samples will usually be established by a crystal oscillator however its clock frequency will be slightly different from that at the transmitter. In packets of limited duration no adjustment of the offset to locate the embedded samples will be required. In long signals a prepulse can be inserted, or a prepulse can be extracted, and used to update the offset required to locate the embedded samples and also update the embedded sample equalizer if required.

The difference in time between samples at the receiver and transmitter is not to be confused with the difference in carrier frequency at the transmitter and perceived frequency at the receiver. In Digital Cellular Systems this results in rotation of the constellation shown in FIG. 13. For a given constellation rotation the transmitted signals may still be viewed as the sum of scaled values of undistorted composing functions and the process of equalization at the receiver is again the process of mapping the received data streams composed of the scaled values of distorted composing functions into the sum of scaled values of undistorted composing functions. Provided an estimate of the rotation can be established at the receiver equations (24) can be modified to reflect this new scaling and the same manipulations performed to determine the equalizer required to map the received data streams into the sum of scaled values of undistorted composing functions. If predistortion equalization is established then the received sample streams will always be the sum of scaled values of undistorted composing functions and rotation of the constellation is not a problem since the information is transmitted as an angular difference between successive symbols and this difference is maintained as the constellation rotates.

The samples associated with the composing function 40 in FIG. 2D define a band limited function. The invention does not require that the samples define a band limited function. An inverse will exist as long as the Z transform does not have any zeros on the unit circle, as discussed. It follows that a composing function can be generated which is not associated with a band limited function but which has an inverse, can be overlapped for transmission, and can be demodulated using an inverse filter. Some transmission medium such as wideband fibre optic cable will permit the transmission of the samples themselves rather than an associated band limited function. The invention described herein then provides a method of encoding and decoding the information to be transmitted in such systems. Scaled overlapping composing functions, embedded sample location, inverse filtering and embedded sample equalization, can be used as described in connection with FIGS. 1A-B.

As described above according to this invention a system for the transmission of information at rates substantially above those achieved by conventional modulation, including a novel equalization system realized by predistorting the transmitted signals to accomplish the equalization.

What is claimed is:

1. A system to transmit information comprising:
   a transmitter including a modulator comprised of means for generating sample streams, said streams being the sum of scaled transmitter located composing functions, wherein the scaling is determined by the amplitude of the information to be transmitted; and a receiver including sample conditioning means operating on received sample streams to generate embedded sample streams, said embedded sample streams being the sum of scaled values of a unique sample sequence; said embedded sample streams being filtered by an inverse finite impulse response filter to generate output sample sequences whose values are related to the scaling applied by said modulator, permitting the recovery of said information; and wherein said inverse filter, when operating to filter said unique sample sequence, generates an output which is substantially a unit pulse; and wherein said receiver may optionally include an embedded sample equalizer which may be used to adjust said inverse filter, thereby maintaining substantially a unit pulse output when said inverse filter operates to filter said unique sample sequence.

2. The system according to claim 1 wherein said received sample streams are undistorted sample streams, said undistorted sample streams being the sum of scaled values of undistorted composing functions, and wherein said sample conditioning means comprise sample selection means, said sample selection means operating on said undistorted sample streams to generate said embedded sample streams.

3. The system according to claim 1 wherein said sample streams from said modulator define continous waveforms; said received sample streams are generated by sampling received continuous waveforms; said sample streams from said modulator are comprised of the sum of scaled values of transmitter located distorted composing functions, said sample streams defining distorted waveforms which after transmission through a transmission channel define said received sample streams as undistorted sample streams; said undistorted sample streams being the sum of scaled values of undistorted composing functions; said transmitter located distorted composing functions being established in a deterministic manner from channel measurements; and wherein said sample conditioning means comprise sample selection means, said sample selection means operating on said undistorted sample streams to generate said embedded sample streams.

4. The system according to claim 3 wherein said means for generating sample streams is comprised of means for generating one sample stream and said undistorted composing function is a dipulse.

5. The system according to claim 3 wherein said means for generating sample streams is comprised of means for generating two sample streams.

6. The system according to claim 4 or 5 wherein said sample selection means comprise eye pattern adjustment and application.

7. The system according to claim 4 or 5 wherein said sample selection means comprise offset determination and application.

8. The system according to claim 1 wherein said sample streams from said modulator define continous waveforms; said received sample streams are generated by sampling received continuous waveforms; said sample streams from said modulator are comprised of the sum of scaled values of transmitter located distorted composing functions; said sample streams defining distorted waveforms which after transmission through a transmisssion channel define said received sample streams as received distorted sample streams; said distorted sample streams being the sum of scaled values of receiver located distorted composing functions; said transmitter located distorted composing functions being established in a deterministic manner from channel measurements; and wherein said sample conditioning means comprise receiver equalizing means and sample selection means; said equalizing means operating on said received distorted sample streams to generated undistorted sample streams; said undistorted streams being the sum of scaled undistorted composing functions; and said sample selection means operating on said undistorted sample streams to generate said embedded sample streams.

9. The system according to claim 8 wherein said means for generating sample streams is comprised of means for generating one sample stream and wherein said undistorted composing function is a dipulse and wherein said receiver equalizing means is a baseband equalizer for baseband systems.

10. The system according to claim 8 wherein said means for generating sample streams is comprised of means for generating two sample streams and wherein said receiver equalizing means is a baseband equalizer for passband systems.

11. The system according to claim 10 and further comprising means for extracting said receiver located distorted composing functions from segments of said received distorted sample streams thereby permitting the determination of a baseband equalizer for passband systems required to operate on said segments to generate segments which are substantially the sum of scaled values of undistorted composing functions.

12. The system according to claim 9, 10 or 11 wherein said sample selection means comprise eye pattern adjustment and application.

13. The system according to claim 9, 10 or 11 wherein said sample selection means comprise offset determination and application.

14. A system for the transmission of information over a channel which may be time varying and fading comprising:
a transmitter including a modulator comprised of means for generating sample streams, said streams being the sum of scaled transmitter located composing functions, wherein the scaling is determined by tile amplitude of the information to be transmitted, said sample streams defining continuous waveforms;
a receiver for receiving said continuous waveforms after having passed through a transmission channel; said received continuous waveforms being sampled to produce received sample streams; receiver equalizing means which operates on said received sample streams to generate undistorted sample streams, said undistorted sample streams being the sum of scaled values of undistorted composing functions; and scaling recover means which operates on said undistorted sample streams to recover the scaling of said undistorted composing functions thereby recovering said transmitted information; and
said system can be varied from full receiver equalization to full predistortion equalization, said full receiver equalization being realized whenever said transmitter located composing functions are comprised of undistorted composing functions, said received sample streams then being the sum of scaled values of receiver located distorted composing functions; said full predistortion equalization being realized whenever said transmitter located composing functions are distorted so that after transmission and sampling said received sample streams are said undistorted sample streams, and wherein said distorted transmitter located composing functions being determined from measurements on the channel.

15. The system according to claim 14 wherein said means for generating said sample streams is comprised of one sample stream generator and wherein said receiver equalizing means is a baseband equalizer for baseband systems and wherein said undistorted composing function is a dipulse.

16. The system according to claim 14 wherein said means for generating sample streams is comprised of two sample stream generators and wherein said receiver equalizing means is a baseband equalizer for passband systems.

17. The system according to claim 16 and further comprising means for extracting said receiver located distorted composing functions from segments of said received sample streams thereby permitting the determination of the baseband equalizer for passband systems required to operate on said segments to generate segments which are substantially the sum of scaled values of undistorted composing functions.

18. The system according to claim 17 and further comprising means for rapidly updating said transmitter located distorted composing functions whereby approximately full predistortion equalization can be maintained as the relative position of transmitter and receiver change.

19. The system according to claim 14, 15, 16, 17 or 18 wherein said undistorted composing function contains a set of interspersed embedded samples, said samples defining a unique sample sequence and a set of embedded sample times; said transmitter transmitting said transmitter located composing functions at said sample times; and wherein said scaling recovery means at said receiver is comprised of sample selection means operating on said undistorted sample streams to generate embedded sample streams, said embedded sample streams being the sum of scaled values of said unique sample sequence; said embedded sample streams being filtered by an inverse finite impulse response filter to generate output sample sequences whose values are related to the scaling applied by said modulator, permitting the recovery of said information; and wherein said inverse filter, when operating to filter said unique sample sequence, generates an output which is substantially a unit pulse; and wherein said receiver may optionally include an embedded sample equalizer which may be used to adjust said inverse filter, thereby maintaining substantially a unit pulse output when said inverse filter operates to filter said unique sample sequence.

20. The system according to claim 19 wherein said sample selection means comprise eye pattern adjustment and application.

21. The system according to claim 19 wherein said sample selection means comprise offset determination and application.

* * * * *